Nov. 22, 1938.  C. W. ABBOTT  2,137,887
METHOD AND APPARATUS FOR CONDUIT CONSTRUCTION
Filed July 14, 1934   5 Sheets-Sheet 2
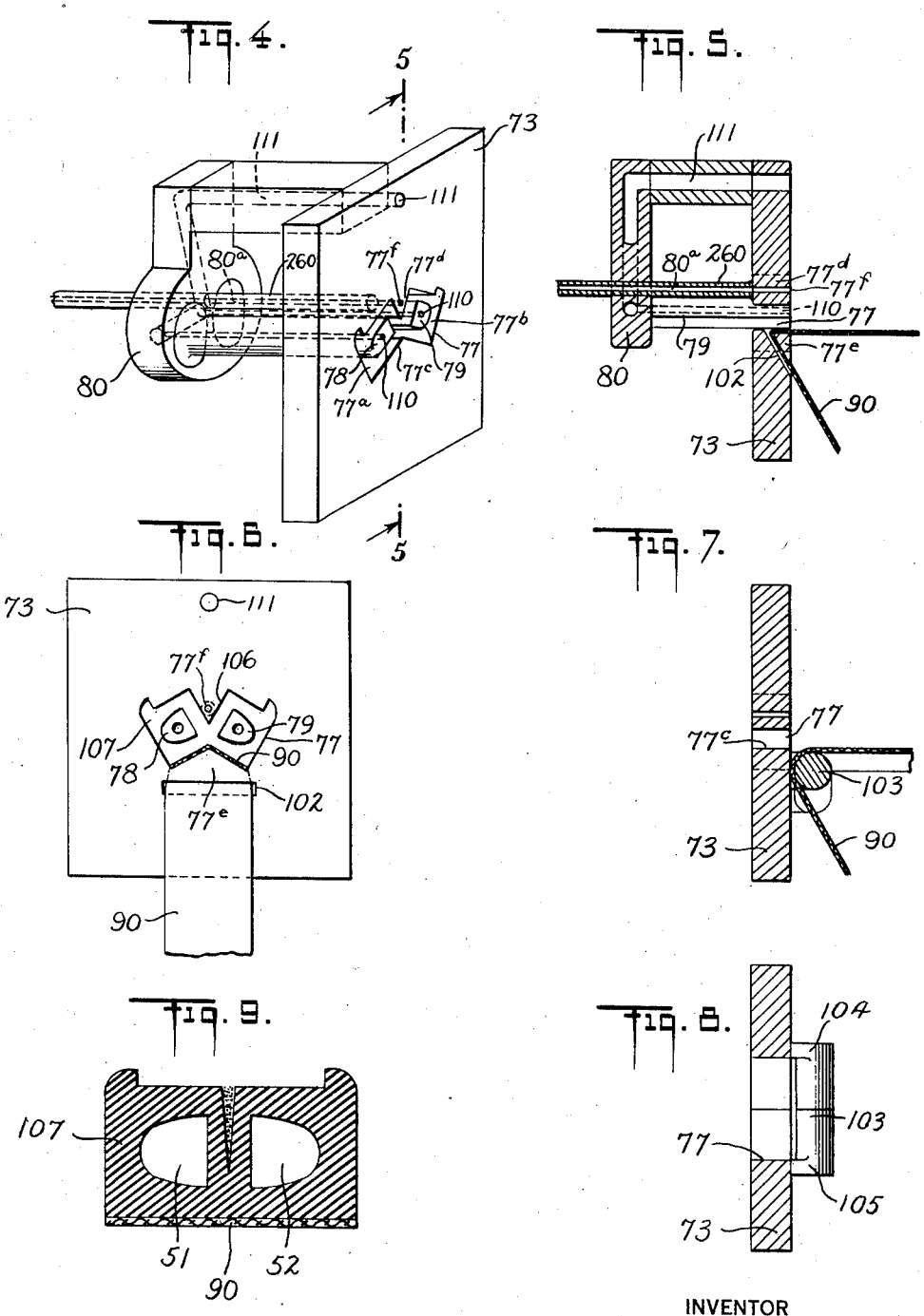
INVENTOR
Charles W. Abbott
BY
Blair, Curtis & Dunne
ATTORNEYS Nov. 22, 1938.   C. W. ABBOTT   2,137,887
METHOD AND APPARATUS FOR CONDUIT CONSTRUCTION
Filed July 14, 1934   5 Sheets-Sheet 3
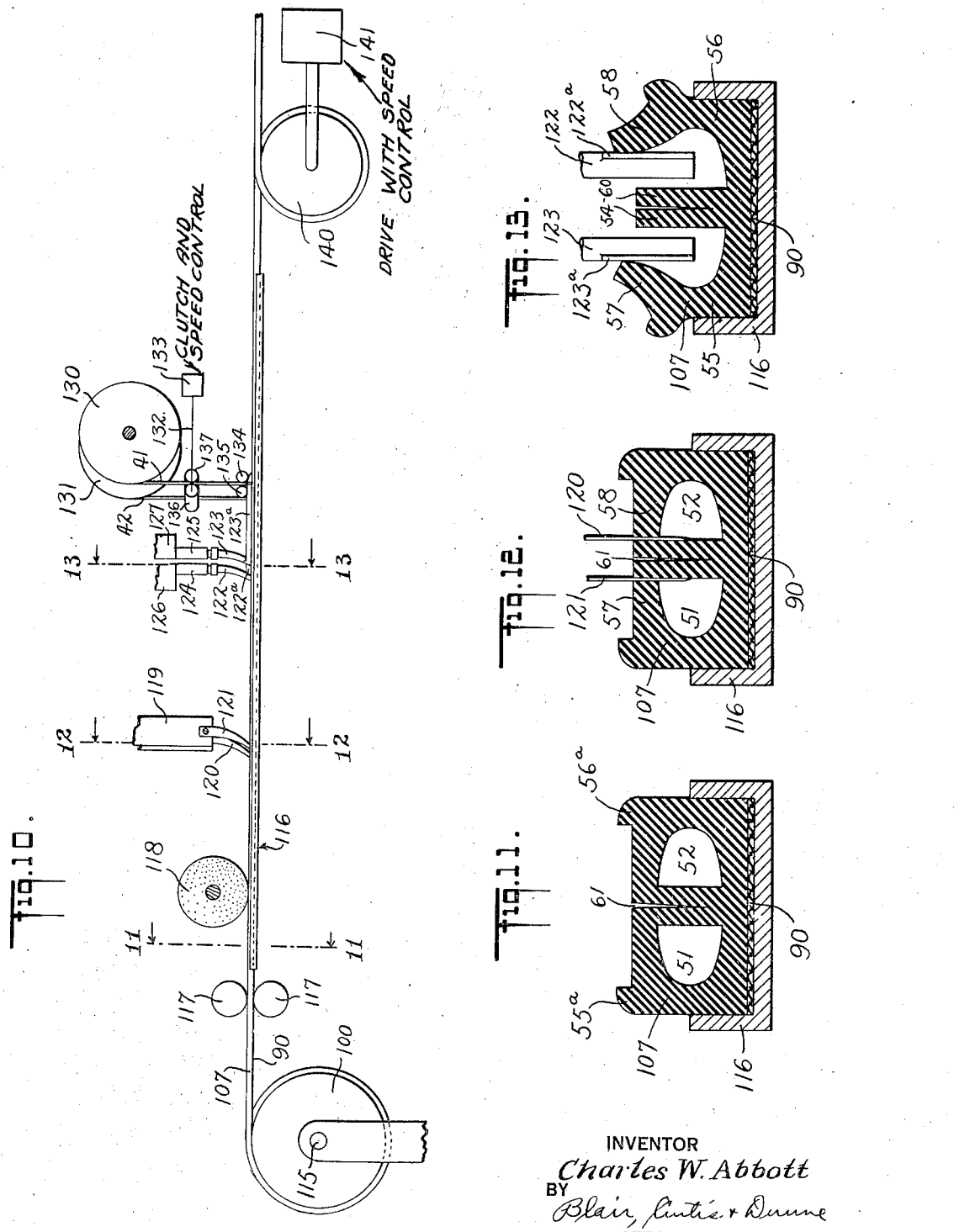
INVENTOR
Charles W. Abbott
BY
Blair, Curtis & Dunne
ATTORNEYS Nov. 22, 1938.    C. W. ABBOTT    2,137,887
METHOD AND APPARATUS FOR CONDUIT CONSTRUCTION
Filed July 14, 1934    5 Sheets-Sheet 4
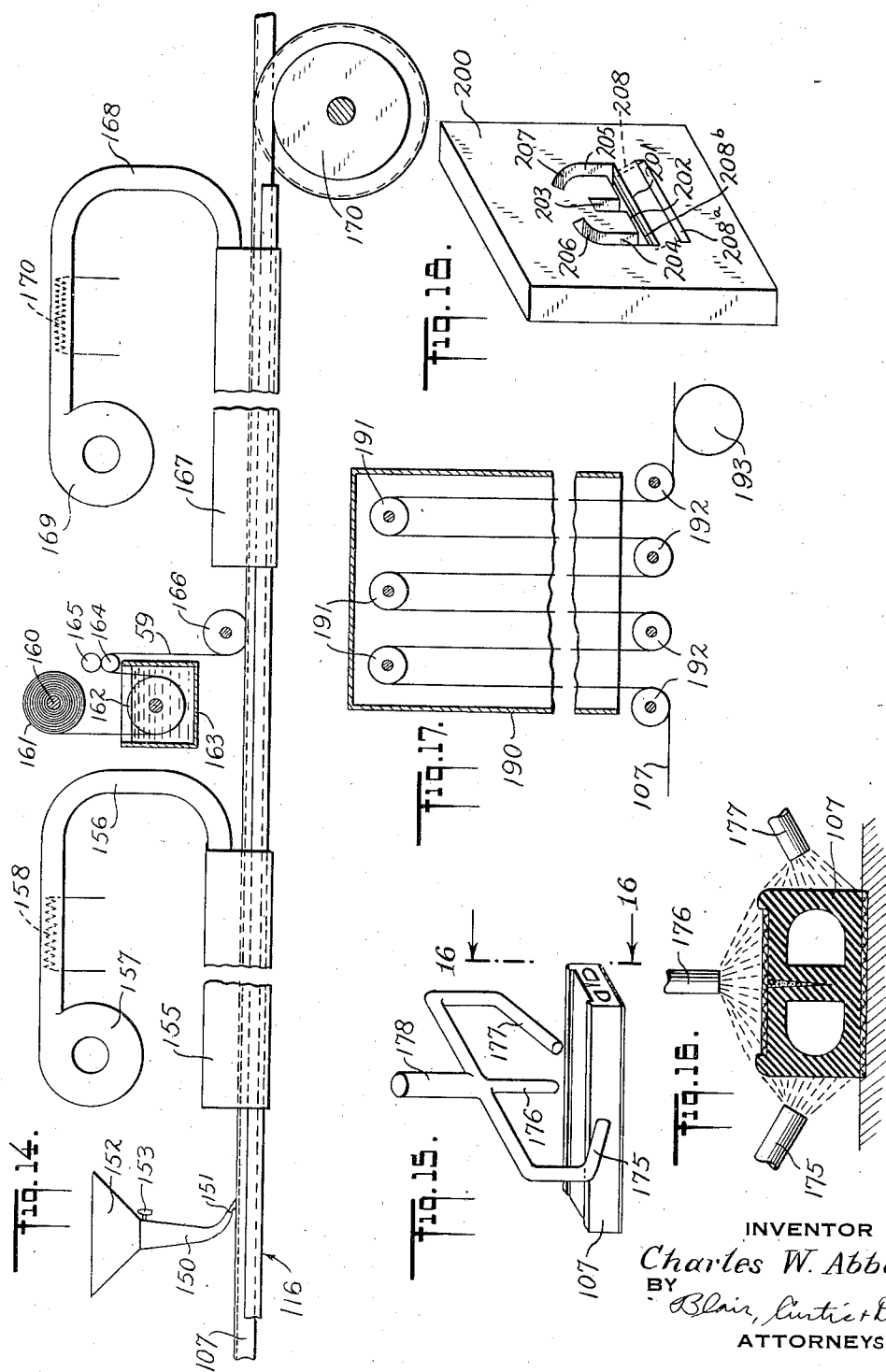
INVENTOR
Charles W. Abbott
BY
Blair, Curtis & Dunne
ATTORNEYS Nov. 22, 1938.   C. W. ABBOTT   2,137,887
METHOD AND APPARATUS FOR CONDUIT CONSTRUCTION
Filed July 14, 1934   5 Sheets-Sheet 5

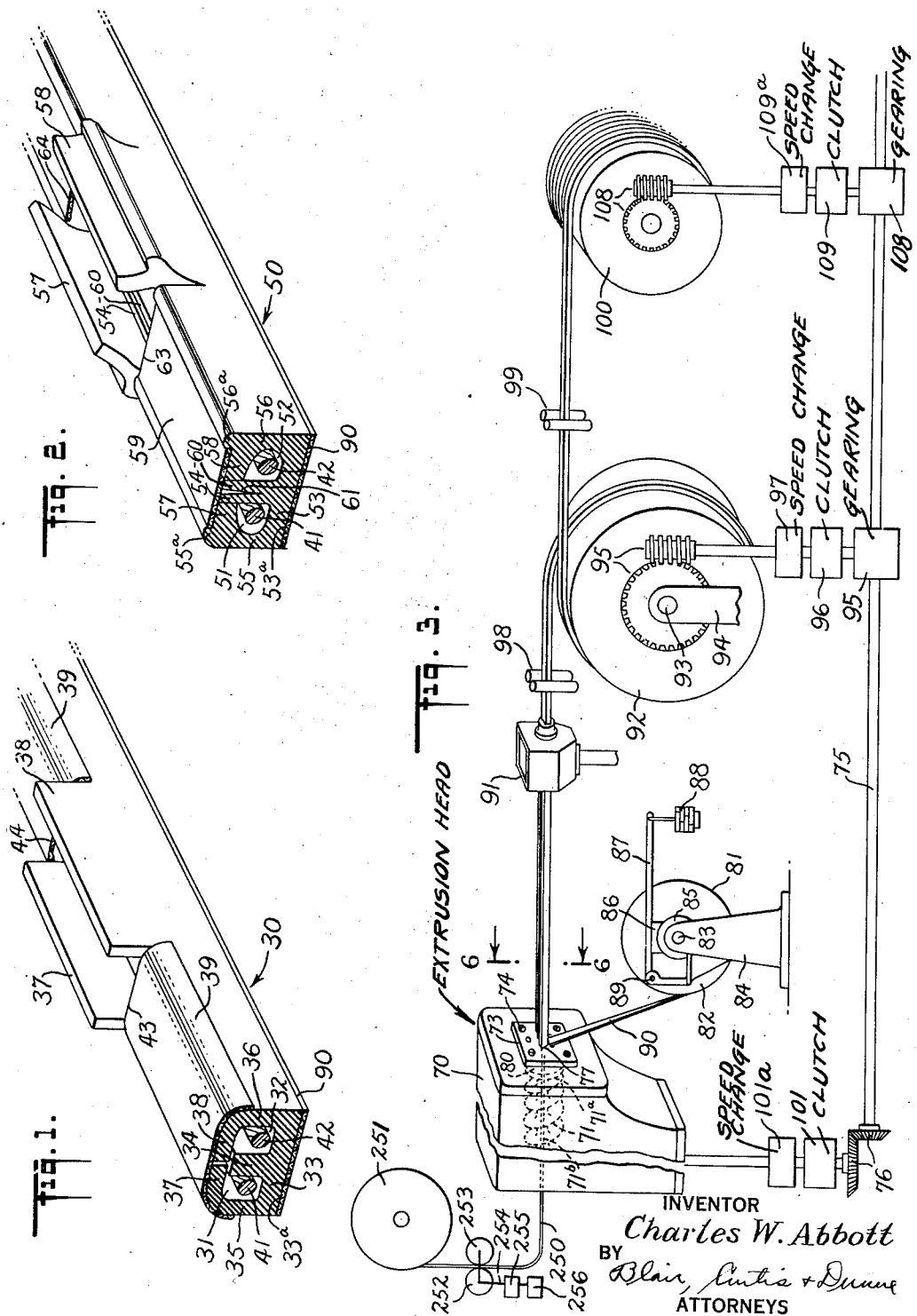

INVENTOR
*Charles W. Abbott*
BY *Blair, Curtis + Dunne*
ATTORNEYS

Patented Nov. 22, 1938

2,137,887

UNITED STATES PATENT OFFICE 2,137,887

METHOD AND APPARATUS FOR CONDUIT CONSTRUCTION

Charles W. Abbott, Larchmont, N. Y.

Application July 14, 1934, Serial No. 735,167

28 Claims. (Cl. 173—244)

This invention relates to a method and apparatus for the manufacture of conduit for carrying conductors for use in electrical circuits and more particularly to conduits of the type disclosed in my application Serial No. 571,962, filed October 30, 1931, matured into Patent No. 1,984,-355.

One of the objects of this invention is to provide a thoroughly practical method and apparatus for making conduit of the above-mentioned character and more particularly for making, completing, and preparing such conduit for ready and dependable installation. Another object is to provide a thoroughly practical and inexpensive method and apparatus for making such conduit out of initially plastic materials or compounds, such as rubber compound, that will be capable of being carried on or operated continuously and hence that will be capable of producing such conduit in unlimited or unrestricted lengths. Another object is to provide a method and apparatus for dependably and inexpensively associating with the conduit being produced the desired conductor or conductors in the conductor-receiving channels. Another object is to provide a dependable and inexpensive method and apparatus for sealing and maintaining closed the conductor-receiving channel or channels in the conduit. Another object is to provide a method and apparatus for preparing and insuring maintenance of good adhesive-coacting or cement-coacting characteristics of one or more faces or surfaces of a conduit, particularly a rubber conduit, which in subsequent use, installation, or practice, is to function in coaction with an adhesive or a cement. Another object is to provide a dependable and inexpensive method and apparatus for preventing distortion or collapse of the cross-section or walls of the conduit while still in uncured or plastic condition, in the course of manufacture of the conduit and more particularly in the process of extrusion thereof and in subsequent steps or stages.

Another object is to provide a simple and thoroughly practical method and apparatus for joining a band or tape-like member, such as a fabric tape, to or mechanically interrelating with a conduit portion that is made of a flexible dielectric material, such as rubber. Another object is to provide a simple and practical method and apparatus for extruding a dielectric material into conduit form and, where the latter is tubular also to prevent atmospheric pressure from distorting or collapsing the extruded conduit form. Another object is to provide a simple and inexpensive method and apparatus for permanently identifying or distinguishing the various conductor-receiving channels of the conduit where the latter has more than one channel. Another object is to provide a method and apparatus for providing in a conduit of a flexible dielectric material, a parting or severance lengthwise of the conductor-receiving channel in a wall in the latter, thereby to provide a flap or slit by which access to the channel is achieved; another object is to provide an efficient method and apparatus for laying a conductor, through the parting or severance in the wall of the conduit; and another object is to provide an inexpensive and efficient method and apparatus for securely but releasably securing together the severed or parted wall portions and thereby to close and maintain the insulation of the conductor-receiving channel. Another object is to provide a practical method and apparatus for making a readily severable multi-channeled conduit of dielectric material whereby the resultant conduit may be readily severed into two or more conduits each having one or more conductor-receiving channels. Other objects will be in part obvious or in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the accompanying drawings in which are shown several of the various possible embodiments of the mechanical features of my invention, Figure 1 is a perspective view of a possible form of conduit to be made according to my invention, and Figure 2 is a similar view of another illustrative possible form of conduit.

Figure 3 is a schematic side elevation of an apparatus for performing certain steps in the production of conduit, certain parts being shown diagrammatically and others in perspective;

Figure 4 is a detached perspective view on an enlarged scale of a die head or extrusion head employed in certain steps in the making of the conduit of Figure 2;

Figure 5 is a central vertical sectional view, as along the line 5—5 of Figure 4, illustrating a preferred construction of die head and indicating another step in my process, said parts being omitted;

Figure 6 is a fragmentary elevation on an enlarged scale as seen along the line 6—6 of Figure 3;

Figure 7 is a view like that of Figure 5 showing another possible construction for carrying out the step indicated in Figure 5;

Figure 8 is a fragmentary plan view of the construction of Figure 7 as the latter would be seen from above;

Figure 9 is a sectional view of the conduit structure as it appears at one stage of the process;

Figure 10 is a side elevation, certain parts being shown in perspective, of an apparatus whereby certain subsequent steps including the insertion of the conductor into the conduit are carried out;

Figure 19:
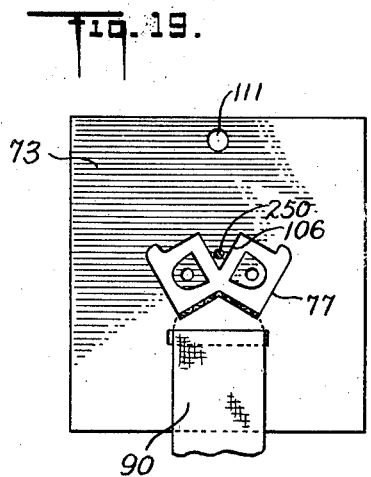
Figure 20:
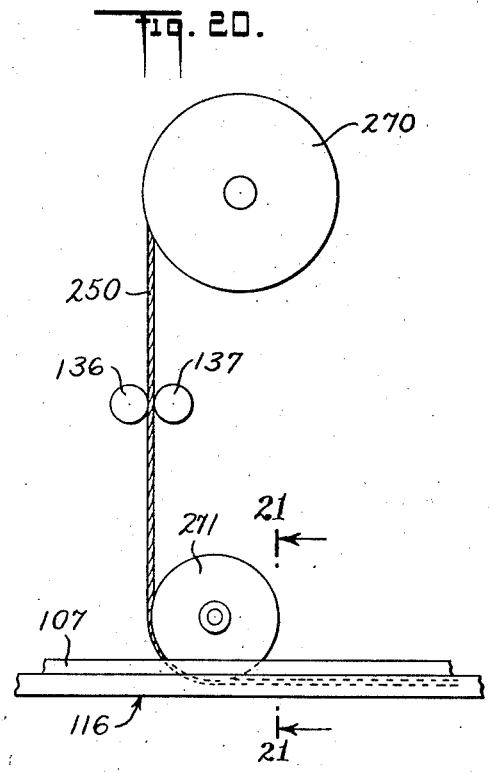
Figure 22:
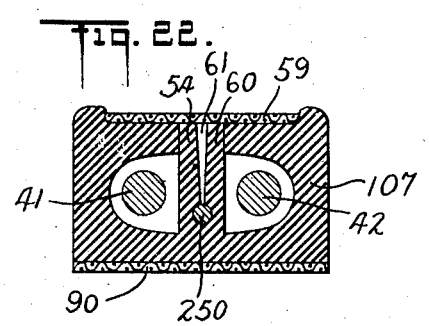
Figure 23:
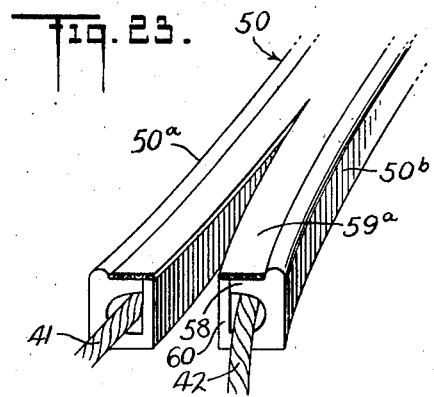
Figure 21:
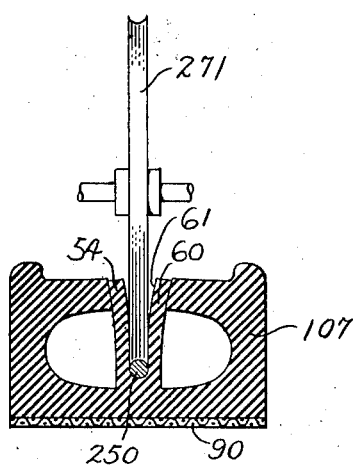

Figures 11, 12 and 13 are vertical sectional views on an enlarged scale as seen along the lines 11—11, 12—12, and 13—13 of Figure 10 and show certain parts of the apparatus more clearly and also show the conduit structure in several of the steps to which it is subjected;

Figure 14 is a side elevation partially diagrammatic of how succeeding steps may be carried on, more particularly how the top or upper tape member is applied to the conduit structure;

Figure 15 is a perspective view showing the application to the conduit of a finish coating;

Figure 16 is a sectional view along the line 16—16 of Figure 15;

Figure 17 is a vertical sectional view, largely diagrammatic, illustrating the step of setting the finishing coating;

Figure 18 is a detached perspective view like that of Figure 4 but showing an illustrative change in construction of the die head when it is desired to construct a different form of conduit such as that of Figure 1;

Figure 19 is a view like that of Figure 6 and hence is a view as seen along the line 6—6 of Figure 3, when certain other features of the die head of Figure 4 are brought into action;

Figure 20 is a view like that of Figure 10 indicating a modified form of apparatus and of method for relating another conductor to the conduit structure being operated upon;

Figure 21 is a transverse sectional view on an enlarged scale as seen along the line 21—21 of Figure 20, showing more clearly the step of relating other conductor to the conduit structure;

Figure 22 is a view like that of Figure 2 showing a preferred form of conduit resulting where the steps of Figure 19 or of Figures 20—21 are employed, and Figure 23 is a perspective view of a conduit like that of Figure 2 showing how, where the conduit is made up of a plurality of conductor-carrying channels, one or more sections of the conduit may be parted from the rest.

Similar reference characters refer to similar parts throughout the several views of the drawings.

As conducive to a clearer understanding of certain features and aspects of my invention, it might first be noted that, in my co-pending application, Serial No. 571,962, matured into Patent No. 1,984,355, I have disclosed, among other things, certain possible forms of conduit, preferably made of a flexible or resilient material like rubber, having certain unique and advantageous features of construction and of action and advantages in practical application, some of which are dealt with or explained in my aforesaid application; in my co-pending application, Serial No. 735,166 filed July 14, 1934, matured into Patent No. 2,066,242, I have disclosed another form of conduit embodying the above-mentioned as well as numerous additional features of construction and of action and advantages in practice. In so far as certain aspects and features of my present invention are concerned, my present invention deals with an efficient, practical, and inexpensive method and apparatus for the reliable, commercial production of conduit having such features of construction, action and advantage as have just been mentioned and as are more clearly set forth in the above-mentioned respective co-pending applications to which reference may be made for greater detail thereof than is herein set forth. For purposes of greater clarity of description and to aid in more readily understanding and appreciating my present invention I have, however, shown in Figures 1 and 2 herein typical or illustrative examples of the various forms of conduit disclosed as above mentioned in my aforesaid co-pending applications and accordingly brief reference may first be made to these illustrative embodiments.

In Figure 1 I have selected, for illustrative purposes, one of the various forms of conduit construction disclosed in my first above-mentioned co-pending application and for present purposes it will suffice to point out that the conduit, generally indicated at 30, is made up of a suitable flexible dielectric material or composition, such as rubber; it has a plurality of conductor-receiving channels therein and illustratively they may be two in number, being indicated at 31 and 32. Conduit 30 has a flat base 33 from which there extend upwardly a plurality of ribs to form therebetween raceways or grooves which coact to form the conductor-receiving channels; where there are two of the latter, these upstanding ribs are preferably three in number, comprising a central rib 34 and two lateral ribs 35 and 36 each spaced to one side of the central rib 34. The outermost ribs 35—36 have extensions or flaps 37—38 respectively which are turned inwardly toward and brought into contact with the central rib 34, thereby closing the conductor-receiving channels 31 and 32, respectively. The flaps or extensions are held in channel-closing position by a fabric or other suitable tape 39 suitably cemented or otherwise secured to the several parts with which it contacts. In the channels 31—32 are received conductors 41 and 42, respectively, preferably bare, and, moreover, being loose.

The conduit 30 is to be run along and secured to such suitable surfaces, usually the walls or other bounding surfaces of a room, or the like, to extend or carry the circuit from point to point as may be required or desired, and it may be run, for example, along baseboards, moldings, door frames, window frames, or the like, all as described in my above-mentioned application. Moreover, and preferably, it is to be secured to its supporting surface by means of an adhesive interposed between the under face 33ª of the base portion 33 and the supporting surface. The adhesive or cement which I prefer to employ for this purpose is a rubber cement of which various possible kinds or compositions are preferred, and in such case it is desirable, as is more clearly set forth hereinafter, to prepare and maintain prepared the under surface 33ª for efficient and dependable coaction with the rubber cement, particularly where the conduit 30 is made of a dielectric that is rubber, and one of the dominant aims of this invention is to provide an apparatus and method for producing conduit having such a prepared surface together with means for insuring the maintenance of the desired or prepared characteristics of that surface.

As is further described in my aforesaid application, the above-described construction of the conduit is such that access, as for tapping the circuit, to the conductor or conductors therein may be speedily achieved at any point in the length of the conduit when installed and this may be brought about without destroying the initially available dielectric and, moreover, in such a way that should it be desired subsequently to remove the tap, the conduit at the point in question may be quickly resored to substantially its initial condition. By reference to Figure 1 certain aspects of this feature of the construction may be perceived; more particularly and assuming for the moment that the conduit in Figure 1 is installed in place on a suitable supporting surface, and that it is desired to gain access to the conductors therein, the upper portion of the conduit 30 is cut crosswise, as with a knife, as along the lines 43 and 44, the cut severing the fabric securing tape 39 and the flaps 37—38; the portion of the tape 39 intermediate of the lines 43—44 of cutting is removed, whereupon the flaps 37—38 may be bent or moved into channel-opening position, as is clearly shown in Figure 1.

The tapping of the circuit 41—42 may then be achieved in any suitable manner, as by means of devices such as disclosed in my first above-mentioned application. Subsequently, however, if it is desired to remove the tap connection, the connecting device is removed and the flaps 37—38 are bent back into channel-closing position, thus restoring the dielectric and again completely enclosing the conductors, the cut portions of these flaps being then held down in place by a new strip of adhesive tape which preferably, also, overlaps the lines 43—44 along which the upper portion of the conduit was cut.

In Figure 2 I have shown in a similar manner another form of conduit construction, being selected from my second above-mentioned copending application to which reference may be had for fuller details of the construction and action. For present purposes it will suffice to say that the conduit generally indicated at 50 has a plurality of conductor-receiving channels, illustratively two in number and indicated at 51 and 52. Like the conduit 30 of Figure 1, the conduit 50 is made up of any suitable flexible dielectric composition, such as rubber. It has a flat base portion 53 and, as may be stated also with respect to the other forms of conduit earlier above mentioned, each conductor-receiving channel is bounded by part of a base portion, two laterally spaced ribs, and an upper closure portion, and where the conduit 50 is to be made up with two conductor-receiving channels, the latter are formed in part by three laterally spaced upstanding rib-like portions that extend lengthwise of the entire conduit. More specifically, there is a central portion 54—60 which may be treated as a single central rib, preferably bifurcated, or which may be treated as two closely adjacent individual ribs 54, 60, all upstanding from the base portion 53. There are two lateral ribs 55 and 56 each spaced to one side of the central rib 54—60, thereby forming grooves which are closed, to form the channels 51, 52, by horizontally and inwardly extending flaps or portions 57 and 58, respectively; these flaps 57—58 extend inwardly from the side ribs 55—56, respectively, at points in the latter intermediate of their upper and lower edges, whereby the side or lateral ribs 55—56 project above the plane of the upper face of the channel-closing flaps 57—58, as at 55ª and 56ª, respectively. For convenience of description, the portions 55ª and 56ª which, as appears from Figure 2, extend throughout the length of the conduit 50, will be termed "external ribs". These external ribs 55ª—56ª with the upper surface of the channel-closing flaps 57—58 define a shallow groove that extends throughout the length of the conduit 50 and it is within this groove that a tape or band 59, preferably of a fabric material, rests and is secured to the parts with which it contacts as by a suitable adhesive or cement. This band, as will now be clear, holds the parts in channel-closing relation. Preferably the edge faces of the channel-closing flaps 57—58 abut against the respective side faces of the central rib structure 54—60, the upper edge face of which falls in the same plane with the upper faces of the flaps 57—58 and is thus also contacted by, and secured to, the securing tape 59. Within the thus-closed channels 51—52 are the loosely carried conductors 41—42, preferably and conveniently bare. Access to the conductors at any point in the length of the installed conduit may be gained in a manner broadly similar to that described above in connection with Figure 1; the upper portion of the conduit 50, including the securing tape 59, is cut transversely as along the lines 63—64, the section of tape 59 thus cut is removed, whereupon the conductor or conductors may now be exposed by bending or swinging the flap portions 57—58 away from each other, and such action may be accompanied by a bending or flexing of the side or lateral ribs 55—56, respectively, particularly if the cross-section of these parts is, as is preferably the case, appropriately proportioned. There may thus be, in order to expose the conductor, a flexing of either a flap (57 or 58) relative to its associated vertical rib (55 or 56, respectively) or a flexing of the lateral rib (55 or 56) relative to the base portion 53, or both. Preferably, the cross-sections are proportioned so that both flexings occur, and in Figure 2 is indicated in perspective how the cut upper portions of the conduit may be flexed to gain access to the conductor or conductors.

Thus, a connection may be made to the circuit quickly and conveniently, preferably utilizing a device like that above mentioned in connection with Figure 1, and in case such a connection is desired to be removed the removal may be effected and the flexed portions of the conduit returned to their normal position, thus restoring the initially available dielectric, and the returned portions of the conduit secured in place by a suitable length of fabric band or adhesive tape fitted into the shallow external groove bounded by the external ribs 55ª—56ª and secured to the parts with which it is thus made to contact, its length being preferably sufficient to overlap the lines 63—64 along which the upper portion of the conduit 50 was severed.

Where the conduit 50, as was the case with the conduit 30 of Figure 1, is to be secured in position by an adhesive and particularly by a rubber cement or the like, the under face 53ª of the base portion 53 is preferably prepared and treated as above-mentioned in connection with Figure 1, and as is set forth in detail hereinafter.

The above will suffice to illustrate certain of the structural features and certain of the practical considerations to be borne in mind and to be met in the manufacture of conduit of this nature and accordingly consideration may now be given to the method and apparatus of my invention for producing structures like those above briefly described; from such considerations, in which various possible changes or modifications in the steps of the process and in the apparatus are indicated and described for achieving ultimate structures having such differences as those which exist between the conduits of Figures 1 and 2, there will be readily apparent such other changes as might be necessary to produce conduits of this type or character having other forms described in my above-mentioned application Serial No. 571,962 (Patent No. 1,984,355), and I wish it to be understood that my process and apparatus are equally capable of the production of such other forms and that I do not wish or intend to be limited herein to the production only of such conduits as happen to be specifically and only by way of illustration shown in Figures 1 and 2 and described in connection therewith.

A preferred material for making up the conduit is, as already above indicated, a rubber of suitable flexibility or resiliency, the latter characteristics being advantageous and preferred for reasons set forth in my co-pending applications. Accordingly, I first make up, out of any suitable constituents, a suitable plastic rubber compound which, when appropriately vulcanized or cured, results in a so-called "rubber" of the desired yieldability, flexibility or resiliency; how to make up such a compound is well known in the rubber art and I need not, therefore, give specific details of possible combinations of constituents to employ for this purpose; illustratively, however, but not by way of limitation, I may make up a compound by utilizing an appropriate proportion, say 40%, of new or unused Hevea rubber to which are added appropriate quantities of material, such as stearic acid, zinc oxide, clay, captax, sulphur, antioxidant, and appropriate coloring matter; whatever combination of constituents is employed, there is brought about thorough and appropriate mixing to achieve placticity of a kind recognized in the rubber art and of a kind that lends the plastic compound to satisfactory extrusion or forcing through a die.

After the rubber compound, in plastic condition, has been suitably worked as above described, it is fed in any suitable manner to a suitable apparatus having a chamber 70 (see Figure 3) which receives the plastic compound and which is provided with any suitable means, such as a rotating feed screw or bladed member whose blade is substantially helical, such as is indicated at 71, whereby the plastic compound is steadily worked or forced in a direction toward the right, as viewed in Figure 3, and hence toward the member 73, hereinafter for convenience termed a "die" or "die head". The die head is provided with an appropriately shaped orifice or orifices through which the plastic compound, moved by the feed device 71, is forced or expelled. The die head 73 is detachably mounted in any suitable manner, as by screws or bolts 74, so that it may be replaced by a die head having a differently shaped orifice (or orifices) when it is desired to change the shape or size of the cross-section of the conduit to be formed. The feeding device 71 may be driven in any suitable manner from any suitable source of power and for purposes of illustration I have schematically indicated in Figure 3 a main drive shaft 75, driven from any suitable source of power, and from which the pressure feed device 71 may be driven by suitable gearing such as is indicated at 76.

Assuming that a conduit substantially like the conduit 50 of Figure 2 is to be produced, the die head 73 that is related to the extruding chamber 70 has formed therein an orifice correspondingly and suitably shaped but preferably, in view of certain features of the construction of this particular conduit 50, having certain unique coacting features as will be pointed out in detail hereinafter.

Accordingly, the die head 73 is constructed and arranged as is better shown in Figure 4 in which these parts are shown on an enlarged scale.

Referring, then, to Figure 4, the die head 73, which is in the form of a suitable plate, is constructed so that the extruding orifice is shaped substantially the same as the cross-section of the conduit 50 as seen in Figure 2 excepting that, for purposes later explained, the two halves (one on each side of a central vertical axis) of the cross-section are tilted one with respect to the other, each half of the orifice, however, being substantially identical in shape and dimension with the corresponding half of the cross-section of the conduit to be formed. Or, viewed in a different light, and still referring to Figure 4, the die plate or head 73 may be considered as having a plurality of extrusion orifices, each orifice being shaped appropriately to form the enclosing walls of one of the conductor-receiving channels, and all of the orifices being connected, as along the bases thereof. These relations of the parts will presently become clearer.

Still referring to Figure 4, and bearing in mind the cross-section of the conduit 50 as viewed in Figure 2, there is cut or otherwise suitably formed in the die head 73, a main orifice 77 made up of a number of sub-orifices or "cells" corresponding to the number of totally enclosed conductor-receiving channels that are to be formed in the final conduit, in the illustrative instance shown in Figure 3, two in number; these sub-orifices are designated at 77ª and 77ᵇ, in Figure 4, and by comparison thereof with the respective halves of the cross-section of the conduit 50, as seen in Figure 2, the identity or geometric similarity of outline becomes readily apparent and will require no further description. The two sub-orifices 77ª and 77ᵇ, however, are tilted with respect to each other so that the lower edge 77ᵉ of the orifice 77 is made up of two angularly related lines instead of a straight line corresponding to the flat bottom face 53ª of Figure 2. The sub-orifices 77ª and 77ᵇ overlap each other or are interconnected just above the apex in the front edge 77ᶜ and just below the V-shaped portion 77ᵈ which separates the cells or sub-orifices 77ª—77ᵇ and which, turning now again to Figure 2, corresponds to the line of division between the central rib portions 54 and 60, as will later become clear. The bottom edge 77ᵉ of the orifice 77 has a length substantially equivalent to the width of the base portion 53 (Figure 2) of the conduit 50, and its two inclined portions are respectively spaced from and parallel to the respective top edges of the sub-orifices 77ª and 77ᵇ by distances substantially the same as the spacing between the plane of the bottom face 53ª (Figure 2) of the conduit 50 and the plane of the upper faces of the flaps 57—58 and of the central rib portions 54 and 60. The upper left-hand corner portion of the sub-orifice 77ª and the upper right-hand corner portion of the sub-orifice 77ᵇ, as viewed in Figure 4, are appropriately shaped to correspond to the external ribs 55ª and 56ª (Figure 2) respectively.

Projecting into the respective several sub-orifices, illustratively two in number, are members, hereinafter termed "horns", one for each sub-orifice; they are shown in Figure 4 at 78 and 79, respectively, and they are shaped in cross-section, particularly throughout those portions that are adjacent to the die head 73 and that project into the orifices, to correspond with the respective cross-sections of the conductor-receiving channels 51 and 52 (Figure 2) respectively. These horns 78—79, in coaction with the outlines of their respective sub-orifices 77ª and 77ᵇ, are thereby made to define not only the shape of the conductor-receiving channels but also the shape and the thickness of the walls that define the respective channels, as will now be clear. It will also be understood that, if the conduit is to have only one conductor-receiving channel, one such horn is employed with an appropriately shaped orifice with which it coacts while if the conduit is to have more than two conductor-receiving channels, a corresponding number of horns is employed, projecting into an orifice or sub-orifices appropriately shaped to coact therewith.

The horns, as is indicated in Figure 4, project rearwardly (or to the left) of the die head 73 throughout an appropriate distance to permit the plastic compound that is to be forced through the orifice to have free and uniform access to the latter, and at their rear ends these horns are removably supported in any suitable manner. Illustratively support may be had by a head 80 which is suitably and removably supported within the chamber 70 (Figure 3) but preferably is supported from and by the bearing head 71ª in which the forward end of the worm 71 is rotatably supported. In Figure 4 this preferred construction or relation of the parts is indicated.

Accordingly, when the plastic compound within the chamber 70 (Figure 3) is subjected to pressure, illustratively by the propeller screw or worm 71, the compound is forced through the orifice structure (see Figure 4) above described and the compound is expelled therethrough or spewed in strip-like form but with a cross-section determined by the shape of the orifice structure. As will now be understood, this extruded conduit form of plastic compound is substantially tubular in cross-section, there being as many longitudinally extending tubular portions thereof as there are horns with coacting orifices or sub-orifices; in the illustrative embodiment (Figure 4) as above described, the spewed plastic conduit form accordingly has two longitudinally extending tubular portions longitudinally joined, however, along their adjacent lower portions, the orifice being shaped, as will now be clear, to provide a common transversely extending base for all of the longitudinally extending conductor-receiving channels and their closing walls.

The rate at which the plastic compound in the chamber 70 (Figure 3) is thus converted into the conduit form depends in part at least upon the rate at which the plastic compound is forced, or maintained under pressure, against the inside face of the die or orifice head; accordingly, the compound-feeding device 71 is driven at an appropriate or suitable rate to maintain continuity of extrusion through the die or orifice head 73. As the plastic conduit form is emitted from the die head 73, it emerges upon a moving carrier preferably in the form of a fabric band or ribbon-like member which, as will later be made more clear, is for certain unique purposes united with the conduit form and ultimate conduit to form a part thereof. This carrier or band member is preferably made of a suitable fabric material and for convenience of description it will hereinafter be termed a "tape". Preferably this tape is of woven cotton and is so constructed as to have its longitudinal edges selvaged. It has a width substantially equal to the width of the bottom face 53ª (Figure 2) of the base portion 53 of the conduit 50 and the material employed in making it and the manner of weaving it are preferably such that the resultant tape has a relatively low coefficient of stretch under the forces to which it is subjected as will be hereinafter set forth, while being suitably strong to meet the conditions of use to which it is subjected in the course of the processes or in the course of subsequent use of the ultimate conduit itself. This tape is preferably made up in rolls of suitable lengths, thereby facilitating the incorporation of the tape into my method, apparatus, and conduit construction.

In Figure 3 is shown a suitable source of supply of such tape preferably, as above mentioned, in the form of a roll 81, suitably mounted adjacent to and substantially underneath the die or orifice head 73. The roll 81 of tape is preferably carried on a suitable spool or drum 82, which may be secured by any suitable means to a shaft 83 so as to prevent relative rotation therebetween. The shaft 83 is rotatably supported in any suitable bearing standard 84 and has secured to it a suitable brake or friction drum 85 with which coacts a brake shoe 86. The brake shoe 86 is held against the brake drum 85 with a suitable pressure, by any suitable means; illustratively the brake shoe 86 may be carried by a lever 87 pivoted at one end as at 89 and carrying at its other end a weight 88, adjustable in any suitable manner, so as in turn to adjust the braking action of the brake 85—86 upon the withdrawal of the tape 90 from the spool 82. The weight 88 may be sectionalized or may be adjustable along the lever 87, by way of illustration.

From the supply drum 82 the tape 90 is "threaded", as it were, through several parts of the apparatus for purposes later herein set forth and it is thereby given a certain path of movement and made to coact with certain other features of the method and apparatus. After leaving the supply drum 82, the tape 90 passes upwardly to the die head 73 to a point in or adjacent to the bottom edge 77ᶜ (see Figure 4) of the orifice 77, whence it extends directly away from the die head 73 (Figure 3) and substantially at right angles to the plane of the face of the die head, thereupon passing through a device 91 by which, as hereinafter described, powdered soapstone is dusted onto the extruded conduit form, thence it passes about a relatively large-diametered drum 92, suitably mounted for rotation, as upon a suitable shaft 93 and bearing standards 94. The drum 92 is driven in clockwise direction, as viewed in Figure 3, at a suitable speed and by any suitable means, illustratively by gearing 95 operated in turn from the main drive shaft 75 and preferably through a clutch 96 and a suitable speed-change or speed-control mechanism 97. The drum 95 has a width of face sufficient to accommodate one or more turns of the tape 90, suitable guiding means 98 guiding the tape 90 onto the driven drum 92 and suitable guiding means 99 guiding the tape as it comes off the drum 92 whence it passes onto a drum 100 whose purpose and function are described hereinafter. Suffice it at this point to say that by means of the driven drum 92, the tape 90 is withdrawn from the supply spool 82 and is caused to move along the path above described; moreover, by means of the speed-control mechanism 97 and a suitable clutch 101 and speed-control mechanism 101ᵃ that is in the driving train of the plastic compound feeding device 71, the rate of movement of the tape 90 in a direction away from the die head 73 may be substantially matched to the rate at which the plastic compound is expelled from the orifice 77. The plastic or uncured compound is, after being forced through the die head 73, now of the desired conduit cross-section, and as it is continuously spewed out of the die head 73, is laid down onto the moving tape 90, the base of the former registering with the latter and the two, because of the character of the compound, promptly adhering to each other; thenceforth the two travel or are moved horizontally as a unit, it being at this point noted that the tape 90, the tension or tautness of which is determined by the brake 85—86, assumes whatever tensional strains are exerted in the operation and thus relieving the still plastic conduit form from such tensional strains and hence from such detrimental effects as distortion, or the like.

As above noted, the tape 90 is preferably related to the die opening or orifice 77 (Figure 4) at or closely adjacent to the bottom edge 77ᶜ thereof. This may be achieved by an arrangement and construction such as is shown in fragmentary cross-section, on an enlarged scale, in Figure 5 which may be considered to be a central vertical section through the die plate 73 of Figure 4, and as appears in front elevation in Figure 6.

Referring then to Figure 5, I provide, in that portion of the plate 73 below the lower edge 77ᶜ thereof, a slot or guideway 102, the latter extending across the entire length of the lower edge face 77ᶜ of the orifice 77 in which edge face its upper end terminates substantially along the central or median plane of the die plate 73, the latter being made of appropriate thickness for this purpose. The slot 102 inclines downwardly toward the right, emerging in the front or right-hand face of the die plate 73 some distance below the lower edge 77ᶜ of the orifice (see also Figure 6).

By this construction there is thus formed what may be termed a cross-bar 77ᵉ over which the tape 90, after passing through the slot 102, passes or is drawn by the capstan drum 92. Moreover, as seen in Figure 5, the upper edge of this cross-bar 77ᵉ is cut down so that the upper face of that portion of the tape 90 that is being drawn away from the orifice 77 is substantially in alinement with the active orifice edge 77ᶜ, and where, as in the construction of Figure 4, this lower edge 77ᶜ is not rectilinear but is of an otherwise irregular shape, such as the flat inverted V-shape of Figure 4, the upper edge of the cross-bar 77ᵉ as is better seen in Figure 6 is similarly shaped and the tautness or tension of the tape 90 insures that the compound-receiving portion of the tape 90 is, by this shape of the cross-bar 77ᵉ, correspondingly shaped.

Still viewing Figure 5, and as better shown in Figure 6, it will be seen, therefore, that, as the plastic or uncured compound is expelled through the die head 73, it is immediately laid down upon and registered with the tape 90, the latter being, at the point of reception thereon of the extruded conduit form, shaped to mate with the cross-sectional shape or outline of the base portion of the conduit form.

The rate of movement of the tape 90 being appropriately related to the rate of extrusion of the conduit form, the latter is therefore carried away from the orifice 77, as fast as it is expelled through the orifice.

Moreover, the extruded conduit form, still in plastic form, is, moreover, pressed into intimate contact with the moving ribbon 90 not only by the weight of the former but also by the pressure of the plastic compound itself as it is being formed in and expelled through the pre-shaped orifice. This latter pressure action may be controlled as by raising or lowering the guide bar 77ᵉ relative to the orifice edge 77ᶜ; for example, if the guide bar 77ᵉ is somewhat raised so that the ribbon 90 is upwardly displaced relative to the orifice edge 77ᶜ, thus in effect diminishing the vertical dimension of the exit end of the orifice 77, the still plastic conduit form and the ribbon 90 are pressed or somewhat squeezed together while both are still confined within the orifice 77, and thus an intimate bonding of the fabric tape and the still plastic material is reliably effected. In effect, the threads (woof or warp or both) of the tape become impressed or embedded into the bottom face of the conduit form, and uniformly so, thus also impressing into the latter the pattern of weave of the tape, all for a purpose more in detail explained hereinafter.

Merely illustrative of another possible way of relating the moving tape or carrier to the orifice, reference may be made to Figure 7 in which I have mounted in front of the lower edge 77ᶜ of the orifice 77 a tape-guide which may take the form of a rounded cross-bar 103; it is spaced forwardly (to the right in Figure 7) of the die plate 73 sufficient to permit easy passage therebetween of the tape 90 and its upper edge is similarly shaped as and suitably alined with the lower edge 77ᶜ of the orifice 77, being preferably sufficiently below that edge so as to bring the upper face of the horizontal portion of the tape 90 in suitable alinement with, and to receive thereon, the bottom face of the emerging conduit form of plastic compound. If the lower edge 77ᶜ of the orifice 77 is other than a straight line in shape, the guide bar 103 is preferably correspondingly shaped, as will be clear in view of what has been said in connection with the construction of Figures 5 and 6.

The guide bar 103 of Figure 7 may be secured to the die head 73 in any suitable manner and it preferably has spaced abutments 104 and 105 (see Figure 8 where the parts are seen as viewed from the top in Figure 7), the latter acting not only to space the guide bar 103 from the die plate 73 but also to maintain the tape 90 properly centered or alined with the orifice 77; more specifically the spacing between the members 104—105 is commensurate with the width of the tape 90 and they thus prevent sidewise displacement of the moving tape relative to the orifice. The action of the construction shown in Figures 7 and 8 will be clear in view of the foregoing description of the action of the structure of Figures 5 and 6 which guides and pre-shapes the moving tape for the deposit thereon of the emerging conduit form. In either case the plastic conduit form and the tape are pressed together and intimately interrelated.

In either case the tape 90 (see Figure 6) as it moves away from the orifice 77 is given the cross-section of a flat inverted V, thus not only mating with the similarly shaped bottom face of the extruded conduit form but also aiding, at least temporarily, to hold the two half sections thereof at an angle to each other (see Figure 6) and thus holding open the V-shaped central trough indicated at 106 in the conduit form 107 which is ultimately to become the rubber portion of the conduit 50 of Figure 2. This trough 106 is thus maintained in dependable condition for receiving therein, as the conduit form 107 with the tape 90 adhering thereto pass as a unit through the device 91 (Figure 3), soapstone powder or dust which the device 91 dusts into the trough 106 as well as onto the remaining exposed faces or surfaces of the uncured conduit form 107. With the exterior surfaces thus coated with the soapstone powder (or, of course, with any other suitable material to serve the same purpose) the adhesive qualities or tendencies of these exterior faces of the extruded conduit form 107 are negatived or removed, thus to prevent, in the subsequent steps, the adhesion of any of these parts to one another or to extraneous parts; the operation does not, however, affect the adhesion between the still plastic conduit form 107 and the tape 90 itself.

The device 91 need not be described in detail; it may be of any suitable construction or action, containing a suitable supply of the powdered material, such as soapstone, and being provided with any suitable means for applying a thin coating thereof or dusting it onto the surfaces of the conduit form.

As the composite structure, now comprising the tape 90 and the conduit form 107, emerges from the device 91, they are drawn, by the capstan drum 92, between the guide members 98, pass preferably only one about the drum 92 (whereby the drive or drawing of tape and conduit form is maintained), and then pass through the guiding means 99 onto the drum or reel 100.

On the face of the drum 92, the base tape 90 (see Figure 6) becomes finally straightened out, since the face of the drum 92 is preferably truly cylindrical. Thereby the two half portions of the conduit form 107, one to each side of the trough 106 (Figure 6), have their angular inclination removed, and the V-shaped trough 106 becomes substantially or almost closed; but the surfaces thereof, having been coated with the soapstone powder, do not adhere or stick together, even though by this flattening out process they might be brought into contact with each other.

The reel or drum 100 is of suitable size and dimension to receive and have wound thereon, in one layer, a suitable or convenient length of combined conduit form (still in uncured state) and fabric tape; for example, it may be desired to furnish the ultimate conduit in lengths of say 1500 feet and hence, illustratively, the reel 100 is of corresponding size and shape to receive such a length, in one layer, of the combined conduit form and tape.

The reel 100 is detachably mounted in any suitable manner as in suitable trunnions or the like and preferably is arranged to be rotated at a speed to wind up the material as fast as it comes off the capstan drum 92. Accordingly, suitable means are provided, such as gearing 108, a clutch 109 and a suitable speed-control or speed-change mechanism 109a for driving the reel 100 preferably from the main drive shaft 75. Likewise any suitable means (not shown) may be provided for appropriately guiding the conduit form and its carrier tape onto the reel 100 to insure that the turns thereof do not overlap and that it is wound thereon in a single layer with the turns side by side. The drive of the reel 100 may be appropriately synchronized with the drive of the capstan drum 92 to insure the maintenance of a steady rate of movement of the tape 90 throughout its above-described path.

As soon as the reel 100 has received the desired length of conduit form, the apparatus is stopped, the conduit form cut off at the reel 100 and the latter is removed; an empty reel is substituted for it, the apparatus is restarted, as is also the winding of the conduit form with its tape onto the substituted reel.

The removed reel with the combined conduit form and tape thereon is now put into a suitable vulcanizer where the conduit form is subjected to appropriate treatment, under heat or pressure or both, as is well understood in the art of vulcanizing rubber, commensurate with the composition of the rubber compound employed. During the curing or vulcanization, the joining of the tape 90 to the base of the rubber conduit is completed, the intimate union therebetween as above described and the impression of the fabric design into the bottom face of the rubber conduit made permanent. Moreover, the presence of the tape, particularly during the drawing of the extruded plastic compound in conduit form away from the die head and during the reeling-up or winding thereof on the vulcanization reel 100 has been effective, for reasons above noted, in maintaining integrity and uniformity of cross-section of the plastic compound conduit form while during vulcanization it continues to act to prevent distortion or collapse of the pre-formed compound undergoing curing or vulcanization.

Recurring to the action of the orifice structure in the die head 73 (Figure 4) several important coactions that there take place might at this point be set forth. Where, as above noted, the orifice or a sub-orifice has a horn member related thereto, the extruded compound is tubular in cross-section; in the illustrative embodiment, a double-tubed cross-section is produced. Where the extrusion is carried on, as in the preferred embodiment of my method and apparatus, to form tubular sections of substantial length, such as on the order of 1500 feet, the rate of extrusion accompanied by the factor of the length of the tube or tubes already formed and being wound onto the reel 100 combine to bring about a lesser air pressure within the tube or tubes than exists in the atmosphere or exteriorly of the conduit form. One of the reasons for the creation of such a detrimental pressure differential may be the fact that it is impossible, due to friction and the relatively small cross-section of the inside of the tube or tubes for the air to be sucked in rapidly enough at the remote open end of the molded conduit form to prevent the external air pressure from overcoming the strength of the still plastic walls of the tube or tubes. Accordingly, the resultant pressure differential acts to cause collapse of the tubular section or sections or at least a distortion thereof, with resultant detriment, as will be readily apparent.

Accordingly, and referring to Figure 4, I provide each horn, such as horns 78 and 79, with a passage 110 therethrough, each passage communicating at its inner end, as in the head 80, with the atmosphere, as by the pipe or tube connection 111. As rapidly, therefore, as the horn or horns become effective, during the rate of extrusion (a rate that is relatively high), in creating the closed conductor-receiving channel or channels in the conduit form, air from the atmosphere passes through the tubular connection 111 and through the passage 110 in the horn or horns and hence into the inside of the tube or tubes being formed out of the plastic material, and thus a balance of inside and outside air pressure is maintained and distortion or collapse of the still plastic conduit form dependably precluded. Also, I am enabled to maintain a high speed or high rate of extrusion.

As earlier above set forth, where the ultimate conduit is to contain more than one conductor-receiving channel, illustratively the two as above described, the orifice 77 (Figure 4) has its sub-orifices or sections that correspond to each conductor-receiving channel substantially identically dimensioned, where ultimate symmetry is desired; this is true and is the preferred arrangement where uniform distribution of pressure throughout the plastic compound on the inner side of the orifice 77 can be and is maintained. However, where a device such as a helical bladed propeller or worm like the device 71 of Figure 3 is employed and depending upon whether the blade helix is right-hand or left-hand, the thrust of the device on the compound causes a greater rate of extrusion of compound through one side or through one sub-orifice of the orifice than through the other, resulting in an unbalanced distribution of compound throughout the cross-section and resulting in a difference in the thicknesses of the walls or parts thereof.

This detrimental action I avoid by appropriately restricting that section or sub-orifice of the main orifice through which a greater rate of extrusion might otherwise take place and with the illustrative form of orifice 77 as shown in Figure 4, I counteract the above-described action and achieve satisfactory uniformity of thickness of the various walls in the ultimate product by shifting the V-shaped portion 77$^d$ of the orifice 77 slightly toward that sub-orifice (for example, sub-orifice 77$^b$) through which the otherwise greater rate of extrusion would take place. Thus sub-orifice 77$^a$ is slightly enlarged and this relation, accompanied by the substantially corresponding non-uniform distribution of pressure of plastic compound due to the helical propeller blade 71, results in a uniform rate of extrusion throughout the entire orifice and hence in uniform wall thickness throughout.

Thus, there is assured that the conduit form that is contained on the reel 100 and subjected to the curing or vulcanizing process is of satisfactory and preferably uniform wall thickness throughout, the structure, after such curing or vulcanization, having a cross-section substantially like that shown in Figure 9, the fabric tape 90 being, as above described, dependably secured to the under face or base of the now flexible and yielding rubber structure 107 which, when compared with the above-described Figure 2, discloses therein certain and various of the counterparts of the final conduit 50 of Figure 2.

The reel 100 with the vulcanized conduit structure thereon, having been removed from the vulcanizer, it being noted that extreme lengths of conduit may be by my method thus vulcanized, is now mounted in suitable trunnions, or the like, as indicated at 115 in Figure 10, whereby the reel 100 is supported at one end of an apparatus about to be described and through which the conduit structure, now like that of Figure 9, may be fed. This apparatus is provided with a suitable table or guideway, generally indicated at 116, into which and along which the conduit structure 107, with the fabric tape 90 thereof lowermost, extends and is fed. The guideway 116 is conveniently channel-shaped in cross-section (see Figure 11) its dimensions being such that the conduit structure 107 relatively easily fits therein and may be relatively easily moved therealong as by appropriate friction or feed rolls 117, preferably arranged in pairs and suitably driven by any driving means, not shown, so as to move the conduit structure 107 lengthwise of the channel guideway 116 at the desired rate of speed, unreeling it from the reel 100 (Figure 10). Thus, the conduit is moved along at a suitable rate with the upper face (as viewed in Figure 11 or Figure 9) thereof exposed and readily accessible for subsequent steps and operations.

First, referring to Figure 10, and assuming that the feed rolls 117 are in operation to move the conduit structure 107 along the guideway 116, there is made operative upon the upper channeled face of the conduit structure a suitable abrasive or buffing wheel 118, suitably mounted above the guideway 116 and driven at a suitable rate of speed; preferably the wheel 118 is vertically adjustable by any suitable means (not shown) to compensate for wear or to determine the intensity or depth of action of the wheel on the conduit structure 107. The wheel 118 grinds off or buffs off the oxide film formed during curing or vulcanization, and since the wheel 118 is shaped and dimensioned to operate within the shallow groove defined and laterally limited by the external ribs 55$^a$ and 56$^a$ (see Figure 11 and compare with Figure 2), the oxide film is thus removed from the walls of this outer shallow groove. This is done for the purpose of preparing the surface or surfaces of this shallow groove for the reception, in later steps of my process, of, and for proper coaction with, a suitable adhesive or rubber cement.

Next in the path of movement (in a direction toward the right as viewed in Figure 10) of the conduit structure 107 is a frame member 119 carrying two cutting tools 120 and 121, one for each conductor-receiving channel in the conduit structure 107 and accordingly and illustratively two in number. These cutting tools, which may take any suitable or appropriate form, project downwardly toward the guideway 116 and (see now Figure 12) they are substantially centered with respect to the guideway 116 but are laterally spaced from one another by a distance substantially equivalent to the thickness of the wall of the conduit structure 107 which separates the two conductor-receiving channels 51 and 52. Moreover, the cutters 120 and 121, which are thus made each to project to one side of this center or dividing wall, project downwardly to a sufficient extent to cut through the respective top walls that define the upper boundaries of the conductor-receiving channels 51 and 52, respectively, all as is better shown in Figure 12.

The cutting tools 120 and 121 are illustratively in the form of slitting knives or blades, they are mounted by any suitable means, not shown, for relatively adjusting them and for adjusting them relative to the guideway 116, in order properly to relate them to the moving conduit structure 107 to perform their respective functions. As the conduit structure 107 is drawn along the guideway 116, therefore, the knives 120 and 121 respectively slit the top walls of the otherwise closed channels 51 and 52 and in effect sever these top walls from the above-mentioned central wall that divides one channel from the other. This relation of parts is indicated and shown in Figure 12. More specifically, it will be noted that there are thereby formed the flaps 57 and 58 (Figure 2) above described in detail in connection with Figure 2 and also the central rib structure 54—60 (Figure 2), the latter being made up in effect of the adjacent rib portions 54 and 60 separated by the slit 61 which, it will now be seen, was initially the V-shaped trough 106 of Figure 6 but the walls of which were not vulcanized together during the step of vulcanization due to the application thereto, as above described, of the soapstone powder or dust in the device 91 of Figure 3.

The slits thus formed by the slitting knives 120 and 121 and in thus forming the flaps 57—58, as better shown in Figure 2 and as indicated also in Figure 12, thus prepare the conduit structure not only for ultimate functioning as was above described in connection with Figure 2, but also for the following steps in my method.

Still referring to Figure 10, I provide, somewhat to the right of the slitting knife or knives, or otherwise suitably positioned to operate upon the conduit structure 107 after the slitting operation, a device for each conductor-receiving channel and adapted to operate upon and through the slit therein; where the conduit structure has two conductor-receiving channels, as illustratively herein assumed, I therefore provide two devices which, in Figure 10, are indicated at 122 and 123, each performing several unique functions and, where there is more than one, all coacting to achieve still another function or result. Each of the devices 122 and 123 is preferably tubular or hollow, extends downwardly to a sufficient extent to project into a conductor-receiving channel, through the slit previously formed in the wall thereof, and is suitably shaped or dimensioned, as by having thereon and projecting to the right thereof a suitably shaped wing, such as the wings 122ª and 123ª for the members 122 and 123, respectively, as shown in Figure 10, and certain actions of which are described later hereinafter.

As above mentioned, the devices 122—123 are tubular; they are connected by tubes or conduits 124 and 125, respectively, to containers or reservoirs 126—127, respectively, the latter containing a suitable material or composition, such as powdered soapstone, which is thus fed from the containers through the respective conduits or tubes to and through the devices 122—123, and thus supplied to the respective conductor-receiving channels in the conduit structure 107 and in sufficient quantity to thoroughly coat or dust the interior walls thereof. As the conduit structure 107 continues to be moved or fed in a direction toward the right (Figure 10) the devices 122—123, functioning in effect as nozzles for supplying the soapstone or like dust or powder to the interior of the channels, continue to feed the material to the inside of the conductor-receiving channels as rapidly as the conduit structure is fed relative thereto.

Any suitable means may be employed for regulating the rate of discharge of soapstone powder, or whatever other material might be used, from the devices; for example, the soapstone containers or the nozzle devices themselves might be subjected to vibration or agitation, as by a mechanically or electrically driven vibrator whose rate of vibration might be varied as desired, and the devices are preferably mounted in any suitable way for vertical adjustment relative to the guideway 116 (see Figure 13) and for adjustment relative to each other, particularly in a horizontal direction, so that they may be quickly and easily accommodated to function upon and in coaction with conduit forms or structures of different dimensions or shapes from the illustrative one now under consideration.

The soapstone or like material that is supplied to the conductor-receiving channels by the devices 122—123 is, moreover, differently colored, there being one color of soapstone for one device and another color for another device, etc. For example, one channel may be supplied with white soapstone powder and the other with powder that is dyed or otherwise colored red; thus, the conductor-receiving channels are permanently distinguished and distinguishable from one another, a feature of particular importance where the ultimate conduit is to be employed in circuits where polarities have to be consistently distinguished from or where other conditions, such as the grounding of one side of the circuit, have to be met. Accordingly, if the utimate conduit, when installed as was described in connection with Figure 2, is opened up as between two transverse cuttings (see the lines of cutting 63—64 of Figure 2) the differently colored soapstone at once distinguishes the respective conductor-receiving channels, irrespective of whether or not the conductors respectively contained therein are marked or otherwise distinguishable from each other.

Aside from functioning as above just described, and as is clearly shown in Figures 13 and 10, the devices 122—123, being appropriately shaped therefor, open up the respective conductor-receiving channels into which they project, bending or flexing the flaps 57 and 58 away from the central rib structure 54—60 (see Figure 13) and it may be noted at this point that such opening of the channels may be accompanied also by a bending or flexing in outward direction of the side wall portions 55—56 of which the flaps 57—58 form a part. The members 122ª—123ª (Figure 10) extend to the right of their respective supporting devices 122—123 and are shaped and are of sufficient length to hold the channels open throughout an appropriate extent to the right of the devices 122—123 in order that the conductors 41 and 42, already mentioned above in connection with Figure 2, may be laid into the conduit structure 107 (Figure 10) as the latter moves toward the right.

The conductor for each channel is supplied from a suitable source of conductor supply, such as a reel, which is driven in any suitable manner to feed conductor to the conduit structure at substantially the same rate at which the latter is being moved along the guideway 116.

Accordingly, I provide a reel 130 for carrying a supply of conductor 41 and a reel 131 for carrying a supply conductor 42, these reels being rotatably supported in any suitable manner, preferably above the guideway 116. Suitable feed rolls 136 and 137, preferably having yieldable operative surfaces, draw the conductors 41—42 off of the reels and are driven by suitable driving means 132 provided with appropriate clutch and speed-control means 133. Suitable guide pulleys 134 and 135, appropriately grooved and supported in any suitable manner over the respective conductor-receiving channels 51 and 52, respectively, to which they are to guide the conductors 41 and 42, insure that the conductors are laid down, through the opened or flexed flaps and into the thus exposed channels. By means of the speed-control means 133 the rate at which the conductor or conductors may be supplied to the moving conduit structure 107 may be synchonized with the rate of movement of the conduit 107 itself.

Where the conduit is to have more than one conductor-receiving channel, such as the two illustratively herein assumed, I distinguish the conductors one from the other in any suitable manner, such as, for example, and particularly where the conductors are bare, as in the preferred arrangement, by tinning one conductor, so as to give it the characteristic outward appearance or color of tin, where the conductor as is usually the case is of copper, and by copper-coating the other conductor or leaving it in its usual state where it is, as is usually the case, of copper. Thus, the reel 130 (Figure 10) contains a supply of tinned copper conductor and reel 131 carries a supply of untinned copper conductor and accordingly the sides or polarity of the circuit or circuits in which the ultimate conduit is to be employed or is already employed may be readily and quickly distinguished, particularly when the conduit is opened up for purposes of tapping, or the like, as is shown in Figure 2, and as was described in detail above. It is to be understood, moreover, that the foregoing is merely illustrative of various possible ways in which the plurality of conductors contained in the conductor-receiving channels may be visually distinguished and is not set forth in a limiting sense. Moreover, while I prefer to employ bare conductor many features and advantages of my invention may be realized in practice even if some covering of some sort is applied to the conductor or conductors and in such case I may use distinguishing colors for cotton or other covering that may be employed. It might also be noted at this point that, for reasons elsewhere set forth, I prefer to employ stranded conductor, the latter having the advantage or capacity of some stretching without diminishing cross-section of the conductor or conductors, a feature of advantage in the installation and use of my conduit construction.

As the conduit structure 107 (now with the conductors inserted into the channels thereof) continues to move toward the right (Figure 10), and as it moves out of the range of action of the flap-opening or spreading devices 122—122ª and 123—123ª, the flap or flaps and side wall or side walls thereof spring back into channel-closing position, the flaps abutting against their respective upstanding rib portions, such as the central rib structure 54—60 of Figure 2. Thereafter the conduit structure may pass in one or more turns over a capstan drum 140 driven through any suitable means including a speed-control or speed-change device 141 by means of which also the rate of movement of the conduit structure 107 along the guideway 116 may be determined at will, the guideway 116 being suitably interrupted to permit the interpositioning of the capstan or feed drum 140.

It is to be understood that, under certain circumstances, I may dispense with the feed drive 136—137 (Figure 10) which acts directly upon the conductors and that I may depend upon the feed rolls 117 or the capstan 140, or like means that act upon the conduit structure to move both conduit and conductor or conductors and thus cause the conductor or conductors to be simply drawn off the supply reel.

Whatever feeding or driving arrangement is employed for moving the conduit structure along during the performance of the above-described as well as the hereinafter described steps or operations, it might be pointed out that, where I employ the base tape 90 above described in detail in connection with Figure 3, the base tape 90, by now (as already explained) securely joined to the bottom face of the conduit structure 107, functions, where and when necessary, to assume any such excessive tensional stresses as would otherwise tend to stretch the rubber conduit structure itself and thus this tape-like material 90 dependably insures proper coaction of the various devices that successively operate upon the rubber structure. Moreover, where such conduit-feeding means as the capstan drum 140 of Figure 10 are employed, this base tape 90 aids also in dependably holding the conduit down in its guideway 116 due to the above-mentioned characteristic of the tape in assuming the pull or tensional stresses that occur during the functioning of the various mechanisms.

Thence the guideway 116 is continued, as in Figure 14, where a suitable adhesive-applying means is brought into action upon the upper surfaces of the conduit 107, particularly the upper horizontal faces of the flap 57 (see Figure 2), rib portion 54, rib portion 60, and flap 58, these surfaces having previously been buffed or ground as by the buffing wheel 118 of Figure 10, as already above described. This adhesive-applying means may be of any suitable form and may be varied to meet the characteristics of the adhesive employed. It may, for example, take the form of a nozzle 150 whose orifice 151 has a width substantially commensurate with the width of the shallow groove or tapeway bounded by the external ribs or shoulders 55ª—56ª (see Figure 2), thereby to spread upon the surfaces of that tapeway, specifically the surfaces that have been previously prepared and buffed by the buffing means 118, the adhesive or cement being supplied to the nozzle 150 in any suitable means and at a rate commensurate with the rate of movement of the conduit structure 107; this means may include, for example, a container 152 for receiving a suitable supply of liquid or plastic cement and means such as a valve 153 for regulating the rate of flow under the pressure head provided for by such an arrangement.

The adhesive thus applied in a film of suitable thickness to the surfaces of the tapeway groove above described, functioning as later hereinafter described to secure the fabric tape 59 (Figure 2) in place, may be of any suitable kind or character for that purpose, but for reasons, certain of which are later set forth, I prefer to employ a cement whose composition is that of substantially pure latex; such a cement is substantially pure rubber in milk or latex form. However, whatever form of cement is employed, a film or layer of suitable thickness is spread along these surfaces of the upper shallow groove or tapeway of the conduit structure as the latter moves along the guideway 116.

Under certain conditions, depending upon the kind of adhesive or cement employed and particularly where the above-mentioned latex cement is employed, I prefer to partially set the cement and to remove any water content which it may contain, after the application of the cement to the tapeway. The latex cement does contain water to some extent. Accordingly, and still referring to Figure 14, the raceway 116 extends through a hood 155 of suitable length so that the conduit 107 passes through the hood 155. In this hood the structure is subjected to heat to drive off the water content from the applied adhesive or cement or to remove sufficient solvents therefrom partially to set the adhesive. This I may achieve by blowing heated air, preferably on the counter-flow principle, through the hood 155 and an illustrative arrangement includes an air conduit 156 discharging into one end of the hood 155 a stream of air derived from any suitable blower or fan 157, the air being heated as by an electric heating coil 158 operating preferably in the air conduit 156.

The conduit structure 107 with the thus partially dried or partially set coating of cement in its tapeway continues to be fed toward the right, as viewed in Figure 14, and as it thus moves along there is applied to the cemented tapeway the tape 59 above described in connection with Figure 2.

The tape 59 is of suitably woven fabric and may be of a character similar to that of the tape 90 above described in connection with Figure 3 and which is the base tape shown in Figure 2. The tape 59, however, need not have a low coefficient of stretch and may be and preferably is more loosely woven than the base tape 90, thus giving it some yieldability.

Preferably the tape 59, before its application to the tapeway, has applied to it a coating of adhesive or cement, preferably of the same nature or character as that applied by the devices 151—152 of Figure 14 to the tapeway itself, and any suitable means may be employed for thus applying a suitable film or coating of adhesive or cement to the tape 59 prior to its application to the tapeway.

Such a possible form of means, particularly where latex cement is employed, is diagrammatically shown in Figure 14 where I provide a suitable support such as a shaft 160 for supporting a spool or reel 161 of tape 59 from which tape 59 passes over an idler 162 contained in a tank or container 163 filled to a suitable level with the cement, the tape 59 being thereby submerged in and drawn through the adhesive and thereby coated therewith; the tape 59 passes out of the tank 163 between two pressure rolls 164 and 165 which remove therefrom surplus adhesive or cement, and thence it passes downwardly under a guide and pressure roller 166 and directly into the tapeway defined by the shoulders 55ª—56ª (Figure 2) of the conduit structure. The roller 166 thus directly applies the adhesive-coated tape 59 to the upper surfaces of the conduit structure 106, rolling it into good and uniform contact with the various surfaces to which adhesive or cement has already been applied by the devices 151—152.

The tape 59, it will now be seen, is drawn through the apparatus which applies adhesive thereto by the movement of the conduit structure 106 itself along the guideway 116.

Thereafter the conduit structure, with the tape 59 now applied thereto, passes through a dryer or heater or other suitable means for hastening the setting of the cement and for thus hastening the preparation of the conduit structure for subsequent steps. This dryer, which may, of course, also function as a dehydrator where cements are employed that have a water content, may be of a character like that already described in connection with partially setting the cement applied to the tapeway itself. Accordingly, it may comprise a hood 167 of suitable length through which the guideway 116 extends supplied with air through the air conduit 168 from a blower 169, the air being heated by a suitable heater 170.

Thus a good bond between the top tape 59 and the rubber conduit structure is achieved. The latex form of cement is preferable because of a number of characteristics which it has and which make it possible for me, in the ultimate conduit itself to achieve certain important advantages. For example, even though set, these latex cements retain their elasticity for very long periods of time and thus, in the subsequent use of the finished conduit (see Figure 2) the danger of shearing along the plane of the bond of the top tape 59 with the conduit surface when the conduit is subjected to substantial flexing or bending particularly about a vertical axis, as viewed in Figure 2, is greatly minimized. The above-mentioned yieldability of or factor of stretch in the top tape 59 may be utilized to counteract this danger or tendency particularly where other cements or adhesives are employed. Also, the latex cements, while forming a secure and reliable bond nevertheless make it possible for the top tape 59 to be cleanly stripped off when occasion therefor arises as, for example, when access to the conductors in the conduit has to be gained as by cutting along the lines 63—64 of Figure 2 to provide a short length of top tape 59 that may be removed and thereby release the flaps 57—58. Of course, other cements, as already above stated, may be employed with good results even though they may not fully achieve or only approach such advantages of the latex cements as has just been pointed out.

After leaving the hood 167 in Figure 14, the conduit 107, now containing the conductors and now having embodied therein both the base tape 90 and the top tape 59 (see Figure 2), may pass about a capstan drum 170 or other feeding means, driven in any suitable manner and in synchronism with the capstan drum 140 (Figure 10) above described, thus insuring a reliable feeding of the top tape 59 from the supply reel 161, and thereafter the conduit has applied thereto a suitable finishing coating, preferably in the form of a suitable paint, lacquer or enamel, or the like.

This coating is applied in liquid form, as the conduit is moved along and preferably after it leaves the capstan drum 170. Any suitable liquid may be employed so long as it bonds well with the rubber in the conduit and is adequately flexible therewith without scaling off or detrimentally cracking. Preferably the coating is applied only to the top and two sides of the conduit structure 107 and accordingly I may spray the liquid coating on these three sides as by an arrangement shown in Figure 15. Illustratively, therefore, I may employ a suitable nozzle construction, for example one employing three nozzles 175, 176 and 177 connected by suitable piping 178 to a suitable source of supply of liquid coating material (and of air pressure if the nozzles are of that type), the nozzles being directed, as shown in Figure 15, to spray the top and two sides of the conduit.

Where I employ lacquer, I use the above-described preferred step of spraying only the top and two sides and I may aid in preventing the lacquer from engaging the base tape 90 by the arrangement better shown in Figure 16 wherein is better shown how the base of the conduit 107 is shielded against the sprayed liquid by the support 116.

After the liquid coating has been applied to the conduit structure, the film or layer thereof on the conduit is allowed to dry in any suitable way. Where a lacquer is employed, it is preferably of the air drying type, thus avoiding the necessity of baking. I prefer, however, to run the thus coated conduit 107 (see now Figure 17) through a suitable drying apparatus or tower 190 in which I may provide a suitable number of idlers 191 and 192 about which the conduit 107 passes, as indicated in Figure 17, so that substantial lengths thereof are exposed, suitable means being provided if desired for passing through the drying tower or chamber 190 an air current or the like to facilitate the removal of the solvent from the coating material and for thus drying the latter.

As above indicated, I prefer to employ, for thus coating the conduit, an enamel or lacquer, these materials being available in a form which, when dried, is flexible or which will yield sufficiently, without detrimental chipping or cracking, when the conduit is flexed as it is in the course of reeling or coiling in lengths suitable for sale or when it is worked or handled in the course of its installation or application to practical use.

In this latter connection, I might note that, in employing a latex cement and a flexible lacquer, I am enabled to achieve a unique and advantageous coaction. For example, I have found that the solvents employed in the lacquers or enamels (or for that matter in other materials that might be employed for coating the conduit) do not affect the cement that may be exposed either through the pores of the top tape 59 or otherwise exposed for contact with the coating applied to the conduit, and thus the cement continues to perform its intended functions and the adherence of the lacquer or coating and hence its permanence is assured. Moreover, the latex cements, when applied to the top tape 59 as above described, do not so completely fill the fibers and interstices outwardly exposed of the tape as would prevent the finishing coating or lacquer from forming a good bond with the fibers of the tape and hence with the tape itself.

After leaving the drying apparatus 190 (Figure 17) the finished conduit, now in the form shown in the cross-section of Figure 2, being drawn therethrough by any suitable feeding means, such as a capstan drum 193 (which also draws the conduit through the coating-applying devices, such as those of Figures 15 and 16) may now be coiled on suitable reels or drums in suitable lengths and thus made ready for shipment.

As above pointed out, the form of conduit shown at 50 in Figure 2 may be treated as illustrative of one of the various forms of conduit of this character which may be made according to my process and apparatus, as was illustratively described in detail above; and of various other possible forms of conduit construction of this character which may be made according to my invention, I have shown in Figure 1 the conduit already above described in detail and to illustrate the possible changes in the steps and apparatus of my invention while still falling within the scope and spirit thereof, it might now be considered how my invention may be carried out with respect to the construction of this illustrative modification and accordingly reference may first be made to Figure 18. In Figure 18 I have shown a die head or orifice head 200 which is substituted for the die head 73 above described in connection with Figure 3. The die head 200 has an orifice 201 shaped not unlike the cross-section of the rubber portion of the conduit 30 of Figure 1, and it will be seen to have a portion 202 corresponding to the base portion 33 of Figure 1, a central recess 203 connecting with the base portion 202 and corresponding to the central rib portion 34; at the respective ends of the orifice portion 202, the latter is provided with upwardly directed extensions 204 and 205, corresponding respectively to the side wall portions 35 and 36 of Figure 1, and these extensions in turn have extensions 206 and 207 corresponding respectively to the flaps 37—38 of Figure 1 though, it is to be noted in Figure 18, these portions extend upwardly at an obtuse angle to the side portions rather than at approximately 90° to the side portions as in Figure 1, so that, when the plastic compound emerges through the orifice 201 and is deposited upon the moving tape 90 (Figure 3), the flap portions 37 and 38 of the conduit form remain out of contact with the rib portion 34, immediately entering the soapstone dusting or powdering mechanism 91 which applies soapstone to the interior and exterior surfaces of the conduit form and thus thereafter prevents the flaps 37 and 38, even if they come down into contact with the central rib 34, from adhering thereto.

The base tape 90 is pressed into intimate contact with the conduit form thus being formed, the die head 200 (Figure 18) being constructed to coact with the base tape 90 in the manner shown in Figure 5 or Figure 7 and fully above described in connection therewith. With the exception of these changes, the apparatus and steps are the same as was fully described above in connection with Figure 3, including the step of vulcanization, the soapstone applied by the mechanism 91 preventing these flaps from being vulcanized permanently to the rib 34 even though they were brought into contact with the latter.

Referring to the die head 200 of Figure 18 and to the manner of pressing the base tape and the plastic compound of the conduit form together and though, as above noted, a construction like that shown in either Figure 5 or Figure 7 may be employed, I have, in Figure 18, for purposes of greater clarity, illustrated therein the slotted arrangement of Figure 5 and it will be noted that the die head 200 is provided with the slot or guideway 208 through which the base tape 90 passes from the supply reel or spool 82 (Figure 3) the guideway being provided with an entry end 208$^b$, the latter being in the face of the bottom edge of the base portion 202 of the orifice 201. The action or coactions of these parts will be readily understood in view of the detailed description given above in connection with Figures 5 and 7.

The orifice 201, or rather its various parts, may, as will be understood, depart sufficiently from symmetry of shape to compensate for non-uniformity of extrusion pressure on the plastic compound if and where such non-uniformity in the action of the feeding device 71 (Figure 3) exists.

After the vulcanization, as above described, the conduit structure is subjected to the steps and operations substantially as above described, particularly in connection with Figures 10-17 inclusive though it may be noted that, in such case, the slitting operation performed by the tool or tools 120—121 (Figure 10) is omitted, the slitting tools being withdrawn or raised out of operating relation to the guideway 116 to a sufficient extent to permit the passage of this different conduit form along the guideway 116 without being acted upon by the slitting tool or tools.

Accordingly, the buffing or grinding operation performed by the wheel 118 (Figure 10) may be immediately followed by the operations performed by the devices 122—123 which not only supply the respective conductor-receiving channels 31—32 (Figure 1) with soapstone, preferably differently colored, but also spread the flaps 37—38 (Figure 1) apart and hold them apart while the conductors 41—42 (Figure 10) are laid into the thus opened channels 31—32, substantially as was already set forth above in connection with Figure 10.

Thereafter the succeeding steps illustratively set forth in connection with Figures 14-17 inclusive and already above described may be carried on, substantially without material or substantial change in the steps or apparatus.

As earlier above pointed out, one of the objects of this invention is also to insure that the under or bottom face of the base portion of the conduit, such as the under surface 33ª of Figure 1 or 53ª of Figure 2, be appropriately conditioned or prepared for application to the wall or other supporting surface, as by a suitable adhesive, preferably a rubber cement; of the various possible ways in which, according to my invention, this object is achieved, it may at this point be first noted that I may achieve that object by interrelating to the conduit structure the base tape 90, as in the manner above described.

This interrelation has a number of important practical advantages, aside from the numerous advantages and coactions, some of which are pointed out above, that are brought into effect during the practicing of my method and during the operation of the apparatus. The intimate association of the base tape 90 with the base of the rubber conduit maintains the under face of the latter in proper condition for excellent coaction with the adhesive or rubber cement; for example, it prevents that under surface from being contacted by the soapstone or analogous powder as well as dirt or other foreign matter, and prevents the latter from embedding itself in the pores or surface thereof, and, more particularly, it acts to prevent the formation, as by oxidation or air-vulcanization, of a somewhat hard or over-vulcanized surface. In this latter connection, the embedded base tape, in precluding exposure of the under surface of the rubber conduit to the action of atmospheric conditions, constituents, or changes, maintains the rubber in a live, fresh, or virgin condition against actions which, particularly over a substantial period of time, might be termed to result in ageing or hardening, a condition which reacts against adequate or dependable coaction with rubber cements. Moreover, there is avoided the necessity, prior to installation of the conduit, of grinding or buffing off the film of hard or air-vulcanized or oxidized rubber.

Accordingly, just prior to applying the conduit to the supporting wall or surface, the base tape 90 is stripped off, thus to expose this protected rubber, and the adhesive, preferably rubber cement of a suitable character, is then applied to the under surface. In this connection another important advantage of my invention comes into play in that due to the partial embedding of the fabric tape 90 into the base portion, as fully above described, there being thus impressed into the under surface the pattern of the weave of the tape, the removal or stripping off of the base tape 90 exposes to the adhesive that is then to be applied a surface having a corresponding pattern, the effect of which is very materially to increase the effective area of the under surface for contact and coaction with the cement itself.

Throughout this thus materially increased effective area of under surface, the rubber cement may properly and intimately coact with the live rubber, and thus insure uniform, dependable, and lasting securing of the conduit to the supporting surface.

Recurring to the conduit construction shown in Figure 2, and as will be clear in view of what has been hereinabove set forth, the central rib portions 54—60 are not vulcanized together and, what was the trough 106 of Figure 6 becomes a comparatively narrow space indicated at 61 in Figure 2 and thus forming a plane or line of cleavage between the rib portions 54 and 60 or a partial cleavage between adjacent portions of the conduit that form the walls of adjacent conductor-receiving channels. This resultant structural feature has a number of important features of coaction and advantage not only in the ultimate installation or use of the conduit itself but also in the carrying out of certain other steps or operations of my method and apparatus where certain structural features are desired to be attained, as will presently be pointed out.

Considering this feature structurally, as shown in Figure 2, and from the viewpoint of use or installations of the conduit in practice, it is to be noted that frequent occasion arises to terminate the conduit in various fixtures or even to by-pass objects or obstacles along the line of application to the supporting wall or surface of the conduit. In such instances, the conduit thus constructed with a double rib intervening adjacent conductor-receiving channels, may, due to this construction, be readily separated or sub-divided into sub-conduits by, for example, using a knife to sever the base portion of the conduit and hence also the top tape 59, the ribs 54—60 guiding the knife as it thus performs the slitting operation throughout such an interval of length of the conduit as may be desired.

Where the conduit has two conductor-receiving channels as shown in Figure 2, such a slitting operation will be seen to sub-divide the conduit 50 into two sub-conduits, each containing its own conduit, and these sub-conduits, maintaining adequate insulation for their respective conductors, may be run into or around fixtures, obstacles, or other devices, as may be desired or as may be necessary in the course of the installation of the conduit. In Figure 23 is shown a conduit having two conductor-carrying channels thus sub-divided and in Figure 23, for purposes of illustration of this feature, the conduit there shown may be considered to be the conduit 50 of Figure 2 and is accordingly thus so marked in Figure 23 and the two sub-divisions thereof, achieved as above described, are indicated at 50ª and 50ᵇ. It will be noted that the flap of the severed sub-conduit, such as the flap 58, for example, is maintained in channel-closing position by the portion 59ª of the severed top tape 59 which holds the flap dependably joined to its adjacent rib portion such as the portion 60.

Considering now certain further steps and operations in my method and apparatus, it may first be noted that under certain circumstances it may be desirable to provide a conduit having conductor-receiving channels of the nature above described in detail and achieving the various practical advantages thereof and having also associated therewith an auxiliary conductor which may be necessary in circuits where there should be included a ground wire, a signaling circuit, or the like, and to illustrate the manner in which, according to my invention, I achieve this object, it may be assumed that a conduit having two conductor-receiving channels is to be provided with a third or what I have above termed an "auxiliary" conductor, though it is to be understood and will be perceived that I may provide one or more such auxiliary conductors as may be required and particularly where the conduit already embodies two or more conductor-receiving channels as above described.

Accordingly, reference may now again be made to Figure 4. The feed worm or screw 71 has an axially extending passage 71ᵇ, the shaft of the worm 71 being exposed exteriorly of the chamber 70 (see Figure 3) so as also to expose the end of the passage 71ᵇ. Into this is fed an auxiliary conductor 250, from a suitable source of supply thereof, such as a supply reel 251 (Figure 3).

Suitable wire or conductor-feeding means may be and preferably are provided to feed the conductor 250 into the passage 71ᵇ at a speed equal to the speed of movement of the conduit form and carrier or base tape 90 as the latter leave the die head 73. This feeding means may comprise a pair of feed rolls 252 and 253 (Figure 3) suitably driven as through the driving means indicated at 254, the latter preferably including a speed-control means indicated at 255 and a clutch indicated at 256 for appropriate control of the feeding movement of the conductor 250 and for synchronizing its rate of movement with the rate of movement of the conduit form leaving the die head 73.

The passage 71ᵇ through which the conductor 250 (Figure 3) is thus fed, is extended by a passage 80ª (see now Figure 4) extending through the head 80 which carries the die-horns 78—79, and thence is extended as by means of a tube-like member 260 which lies in a plane generally intermediate of the horns 78—79, the tube-like member 260 terminating (see Figures 4 and 5) in the V-shaped part 77ᵈ of the die plate 73, to which it is secured in any suitable manner. The V-shaped part 77ᵈ is provided with a hole 77ᶠ (Figures 4 and 5) which is alined with the passage in the tube member 260 and which thus forms the terminus of the passage through which the auxiliary conductor 250 (Figure 3) is passed and which passage began, as above described, with the passage 71ᵇ in the shaft of the worm 71.

Conductor 250, therefore, emerges through the exit 77ᶠ of the die head as it is fed through the above-described channel or passage and, turning now to Figure 19, is laid down in the trough 106 in the conduit form 107 and which trough was described in detail above in connection with Figures 3, 4, 5, 6 and others. In Figure 22 the conductor 250 is seen thus laid down in the trough 106 formed in the conduit form 107 which is still in plastic condition. The conductor 250 may be of any suitable size or construction but preferably it is bare and stranded. It may or may not be covered with an insulating covering such as cotton, or the like, as may be desired.

From that point on, that is, upon the completion of the step of laying the conductor 250 into the trough 106 (Figure 19), the steps above described in detail, particularly in connection with Figures 3–17 inclusive, may be carried on, though it might be noted that, with the conductor 250 laid in the trough 106, I prefer to prevent vulcanizing together the walls of the trough 106 in the manner already above described. With the conclusion of the steps and operations just mentioned and as it is when installed, the resultant conduit appears as is shown in Figure 22 in which, it will be noted, the conduit, otherwise like that shown in Figure 2 and described in detail in connection therewith, has this auxiliary conductor 250 extending lengthwise thereof and in the bottom of the space that intervenes the rib portions 54 and 60. It is thus dependably insulated from the conductor or conductors in the adjacent conductor-receiving channels, such as channels 51 and 52, it is dependably held in the bottom of the slit 61 between these two rib portions 54 and 60 and, moreover, the slit is kept closed by the top tape 59.

This auxiliary conductor 250 is thus available to meet such special conditions or circumstances as practice or circuit requirements demand and, moreover, access to it can be easily gained at any point along the length of the installed conduit by stripping off a suitable section of the top tape 59, thus to expose the slit between the ribs 54 and 60 and thus, upon parting one from the other, to gain access to the conductor 250. A connection may thus be made to the conductor and, moreover, such connection might be made at the same point in the length of the conduit where the main conductor, such as conductor 41 or 42 or both, of the conduit, is made accessible as by bending back the flaps (see Figure 22).

I may, however, also pursue another method of relating this auxiliary conductor 250 to the space between the central rib portions 54 and 60, as is indicated in Figure 20. In accordance with this possible alternative method, I follow the steps and operations as I first described above in connection with Figures 3–17 inclusive but the apparatus of Figure 10 now has embodied in it at a suitable point in the path of travel of the conduit form 107, as, for example, at a suitable point between the devices 122—123 and the mechanism for laying the conductors 41—42 into their channels 51 and 52, an apparatus which takes the form shown in Figure 20, thereby to interpose in the above-described sequence of steps and operations other steps for the laying of a conductor into the slit 61.

Accordingly, the conduit form 107 (Figure 10) is drawn along the guideway 116, has its upper surface or tapeway ground by the grinding or buffing wheel 118, the top wall of each channel severed from the central rib portion as by the knife or knives 120—121, the identifying soapstone powder or the like injected into the opened conductor-receiving channels as by the devices 122—123 and the conductors 41—42 laid into the channels held open by the devices 122ª and 123ª but while the channels are held open as was above described in connection with Figures 10 and 13, it will be noted that the central rib structure 54—60 is thereby held in exposed position and accordingly the slit therebetween likewise exposed in an upward direction.

Accordingly, I provide a supply reel 270 (Figure 20) carrying a supply of conductor 250 and mounted in any suitable position and providing with suitable means for feeding and guiding conductor to the thus exposed slit. For example, I may utilize the same feed rolls 136 and 137 that feed the conductors 41 and 42 into their respective conduit channels at a rate of movement equal to the rate of movement of the conduit structure 107.

Upon leaving the feed rolls 136—137 the conductor 250 passes over a grooved idler 271 (see now Figure 21), which is rotatably mounted over the guideway 116 at such a spacing from the bottom of the latter (Figure 21) that its peripheral portions enter into the slit 61 between the rib portions 54 and 60 and in fact bottoming in that slit as the conduit structure 107 moves along, all as is clearly shown in Figure 21.

Thus, as the conduit structure 107 is moved along the guideway 116, as by the capstan drum 140, the auxiliary conductor 250 is pressed and laid into the slit between these rib portions 54 and 60 and dependably bottomed in that slit.

With the use of an idler like the idler 271 of Figure 21 for laying the conductor in the slit 61, I may dispense with the feeding action of the feed rolls 136—137 of Figure 20 and depend upon the pull of conductor 250 as it is moved along by the capstan drum 140 with the conduit structure 107 to reel it off the supply reel 270; I may also utilize the action of the rolling contact of the wire-laying idler 271 with the conduit structure 107 to aid in bringing about a feed of the conductor 250 into the slit 61.

After the conclusion of the steps above described in connection with Figure 20 where I employ that possible step of relating the auxiliary conductor to the conduit, the conduit structure is subjected, as will now be clear, to such steps as are indicated in Figures 14–18 inclusive, the conduit structure resulting therefrom and as it appears when installed being that of Figure 22 and which was already above described.

It will thus be seen that there has been provided in this invention an art and apparatus in which the various objects hereinbefore noted, together with many thoroughly practical advantages, are successfully achieved. It will be seen that the art and apparatus are of a thoroughly practical nature and are well adapted for efficient and rapid production of the unique conduit construction. To better illustrate certain unique aspects of the latter, it might be noted that, where the conduit construction has two conductor-receiving channels, as in the illustrative embodiment shown in Figures 1 and 2, thoroughly dependable and reliable results are achieved where the base portion of the conduit has a width on the order of ½" and a vertical dimension (all as seen in the cross-sections of Figures 1 and 2) on the order of $\frac{5}{16}$", the remaining dimensions of other features and parts of the cross-section being substantially to that scale.

Furthermore, it will be seen that the art above described may be readily and efficiently carried on in practice.

As many possible embodiments may be made of the mechanical features of the above invention and as the art therein described might be varied in various parts, all without departing from the scope of the invention, it is to be understood that all matter hereinabove set forth, or shown in the accompanying drawings is to be interpreted as illustrative and not in a limiting sense.

I claim:—

1. In apparatus of the character described, in combination, a die having an orifice whose shape is like that of the cross-section of the conduit desired to be formed, means for forcing through said orifice a plastic rubber compound, means for preventing distortion of, and for uniting a tape with, the extruded conduit form, said last-mentioned means comprising means for guiding the tape from a point adjacent said orifice to receive thereon the extruded conduit form to a point remote from said orifice, and means in the apparatus independent of said extruding means but substantially synchronized therewith for drawing and moving the tape with the extruded form thereon in a direction away from said orifice at a rate substantially equal to the rate of extrusion of said conduit form through said orifice, thereby to relieve the extruded conduit form from distorting strains and to maintain substantial uniformity of cross-section thereof.

2. In apparatus of the character described, in combination, a die having an orifice whose shape is like that of the cross-section of the conduit desired to be formed but with a base of inverted V-shape, means for forcing through said orifice a plastic rubber compound, means for uniting a tape with the extruded conduit form without subjecting the latter to longitudinal compression, said last-mentioned means comprising means forming a supply of tape, power driven means for drawing tape from said tape supply means, and means intermediate of said supply means and said tape-drawing means for guiding the tape from a point adjacent said orifice in a direction away from the latter, said guiding means being shaped to give said tape an inverted V-shaped cross-section substantially matching that of said base, thereby to receive thereon the conduit form extruded through said orifice, said power driven means maintaining said tape, as it is drawn away from said orifice, under such a tension that the extruded conduit form carried by said tape is substantially relieved of distorting strains.

3. In apparatus of the character described, in combination, a die having an orifice whose bottom edge is substantially rectilinear and other portions for forming relatively thin walls in the conduit form extruded through said die, means for forcing a plastic compound such as rubber compound through said orifice, said bottom edge substantially shaping an external face of the conduit form extruded through said orifice and said other portions shaping thin-walled parts in said conduit form, means for guiding a tape of a width commensurate with the length of said bottom edge from a point adjacent the latter to a point remote therefrom, and means for pulling said tape in the direction from said first-mentioned point to said second-mentioned point at a rate commensurate with the rate of emission of extruded conduit form from said orifice, thereby to receive the extruded conduit form and move it away from said orifice, said tape-pulling means maintaining the tape under such tension, as it moves away from said orifice with the extruded conduit form thereon, that the latter is substantially freed from such longitudinal strains as would materially distort said thin-walled parts.

4. In apparatus of the character described, in combination, a die having an orifice partially divided by a substantially V-shaped member directed crosswise of the orifice, said orifice having, opposite said V-shaped member, an edge which is generally V-shaped with its apex directed toward the apex of said V-shaped member, means for forcing an uncured plastic compound through said orifice, means for substantially straightening out that face of the compound emitted from said orifice that is defined by said V-shaped edge, and means for curing the compound in the form given it by said orifice and resulting from said straightening means and maintaining separated the faces thereof formed by said V-shaped member.

5. In apparatus of the character described, in combination, a die having an orifice partially divided by a substantially V-shaped member directed crosswise of the orifice, said orifice having, opposite said V-shaped member, an edge which is generally V-shaped with its apex directed toward the apex of said V-shaped member, means for forcing an uncured plastic compound through said orifice, means for drawing formed compound away from said orifice, means for substantially straightening out that face of the formed compound that is shaped by said substantially V-shaped edge, and means for supplying to the groove formed by said V-shaped projection a material to prevent adhesion of the walls of the groove.

6. In apparatus of the character described, in combination, means for holding a supply of band-like material, means operating to exert a certain resistance to withdrawal from said supply-holding means of said band-like material, means for withdrawing band-like material from said supply-holding means and operating to overcome said resistance-exerting means, whereby said band-like material is withdrawn at and under a certain tension, and means for extruding in tube-like form and onto said moving band-like material an uncured plastic compound, the rate of operation of said extruding means being synchronized with the rate of movement of said band-like material.

7. In apparatus of the character described, in combination, means for holding a supply of band-like material, said means including a rotary member that is rotated as material is withdrawn from said supply-holding means, means operating upon said rotary member to resist rotation thereof, means for withdrawing band-like material from said supply-holding means against the resistance to rotation of said rotary member, whereby said band-like material is withdrawn at and under a suitable tension, a die having an orifice positioned at a certain point in the path of travel of said band-like material, and means for forcing a plastic compound through said orifice and onto said moving band-like material, said orifice having an outline shaped substantially like the cross-sectional outline of the conduit desired to be formed.

8. In apparatus of the character described, in combination, means for holding a supply of band-like material, said means including a rotary member that is rotated as material is withdrawn from said supply-holding means, means operating upon said rotary member to resist rotation thereof, means for withdrawing band-like material from said supply-holding means against the resistance to rotation of said rotary member, whereby said band-like material is withdrawn at and under a suitable tension, a die having an orifice positioned at a certain point in the path of travel of said band-like material, means for forcing a plastic compound through said orifice and onto said moving band-like material, said orifice having an outline shaped substantially like the cross-sectional outline of the conduit desired to be formed, said plastic compound being uncured and said band-like material being textile, and means for curing the compound forced through said orifice and for thereby uniting said textile material thereto.

9. In apparatus of the character described, in combination, means for holding a supply of band-like material, said means including a rotary member that is rotated as material is withdrawn from said supply-holding means, means operating upon said rotary member to resist rotation thereof, means for withdrawing band-like material from said supply-holding means against the resistance to rotation of said rotary member, whereby said band-like material is withdrawn at and under a suitable tension, a die having an orifice positioned at a certain point in the path of travel of said band-like material, means for forcing a plastic compound through said orifice and onto said moving band-like material, said orifice having an outline shaped substantially like the cross-sectional outline of the conduit desired to be formed, said plastic compound being uncured rubber compound and said band-like material being of relatively coarse textile whose protrusions embed themselves into said uncured rubber compound as the latter is deposited thereon for said orifice, and means for subsequently curing the compound and thereby uniting it and said textile material.

10. In apparatus of the character described, in combination, means for holding a supply of tape-like material, means including a driven drum for drawing tape-like material from said supply-holding means, means operative intermediate of said supply-holding means and said driven drum for depositing onto the moving tape-like material an uncured plastic compound of conduit cross-section, whereby the deposited compound is by said tape-like material relieved of detrimental tensional strains, and means for thereafter curing the compound of conduit cross-section.

11. In apparatus of the character described, in combination, means for holding a supply of tape-like material, means including a driven drum for drawing tape-like material from said supply-holding means, means operative intermediate of said supply-holding means and said driven drum for depositing onto the moving tape-like material an uncured plastic compound of conduit cross-section, whereby the deposited compound is by said tape-like material relieved of detrimental tensional strains, means including a drum for having said tape-like material with the deposited conduit compound wound thereon with the tape-like material innermost, and means capable of receiving said last-mentioned drum with the conduit compound and tape-like material thereon for curing said conduit compound.

12. In apparatus of the character described, in combination, means for holding a supply of tape-like material, means including a driven drum for drawing tape-like material from said supply-holding means, means operative intermediate of said supply-holding means and said driven drum for depositing onto the moving tape-like material an uncured plastic compound of conduit cross-section, whereby the deposited compound is by said tape-like material relieved of detrimental tensional strains, and means capable of receiving said drum with the tape-like material and conduit compound wound thereon for curing said compound.

13. In apparatus of the character described, in combination, a die having an orifice partially divided by a substantially V-shaped member, means for forcing an uncured plastic compound through said orifice, said member forming substantially a trough in the conduit form formed by the material emerging from said orifice, said die having an aperture positioned substantially on the axis of said member, and means for feeding a conductor through said aperture and into said trough in the conduit form.

14. In apparatus of the character described, in combination, a die having an orifice for forming, out of a suitable plastic uncured insulating compound, two continuous and unitary jackets or coverings for two conductors with a common wall therebetween for separating the two conductors, and having a member related thereto substantially along the central axis of said orifice for acting upon that portion of the compound that is to make up the aforesaid common wall, means for forcing an uncured plastic compound through said orifice, said member forming substantially a partial division in the said common wall portion of the compound formed by the material emerging from said orifice and thereby to give said common wall portion two layers or thicknesses, means for placing in between said two layers or thicknesses of said partially divided common wall a suitable material to prevent direct adhesion of said two layers or thicknesses, and means for curing the compound in the form given it by said orifice and with said adhesion preventing material therein.

15. In apparatus of the character described, in combination, a die having an orifice partially divided by a substantially V-shaped member, means for forcing an uncured plastic compound through said orifice, said member forming substantially a trough in the conduit form formed by the material emerging from said orifice, means for laying a conductor into said trough as said conduit form moves in a direction away from said orifice, means for applying to the walls of said trough a material adapted to prevent the walls of said trough from adhering, means for substantially closing said trough, and means for curing the conduit form with the conductor in the substantially closed trough therein.

16. The herein described art which comprises moving a substantially non-stretchable band of suitable material in the direction of its length, extruding onto said moving material while maintaining said band under tension and lengthwise thereof an uncured compound in conduit form, whereby the walls of said conduit form are relieved by said tensioned band from distorting strains, and curing the compound in said conduit form while still related to said band.

17. The herein described art which comprises effecting a steady forward movement of a fabric tape in the direction of its length, maintaining said fabric tape under suitable tension as it is thus moved, extruding onto the fabric tape, and at a rate commensurate with its rate of movement, a plastic uncured rubber compound in conduit form, whereby the walls of said still plastic conduit form are relieved by said tensioned tape of distorting strains pressing the conduit form and said tape together, thereby to partially embed the tape into the plastic compound of the conduit form, and curing the conduit form with the fabric tape thereon, thereby to unite the two.

18. In apparatus of the character described, in combination, a die having an orifice provided with a base portion and at least two spaced portions upstanding therefrom, thereby giving said orifice a substantially U-shape, means for forcing through said orifice a plastic rubber compound, whereby the latter is given a substantially corresponding U-shaped cross-section, means for supplying to the resultant conduit form of the extruded plastic compound a material to prevent adhesion of the flap-like arms thereof, means for curing the conduit form, means for parting the flap-like arms of the conduit form, and means operating during the parting of said flap-like arms to insert into the space therebetween an electrical conductor.

19. An apparatus as claimed in claim 18 having means, operating after the conductor is inserted into the conduit form, for applying to the conduit form means that hold the flap-like arms thereof against separation.

20. An apparatus as claimed in claim 18, having means for moving the conduit form with the inserted conductor therein in the direction of its length, means in rolling contact with that face of the conduit form at which the junction between the flap-like arms thereof are exposed for laying onto said face an adhesive tape for holding said flap-like arms against separation.

21. An apparatus for sheathing a flexible element in a longitudinal substantially straight passage of a hollow flexible preformed strip having a longitudinal slit formed in the wall of said passage, said apparatus comprising means for progressively spreading a portion of said slit, means for guiding the flexible element into said passage through the spread portion of said slit, and means for drawing said strip in cooperative relation with said slit spreading and element guiding means and for simultaneously drawing said element from said element guiding means and into the passage of said strip by the movement of said strip.

22. An apparatus for sheathing a flexible element within a preformed strip having a passage therein, comprising the combination of means for removing the outer skin of said strip, means for longitudinally slitting the wall of said passage through said skinned surface, means for guiding said element into said slit, and means for longitudinally moving said strip from said slitting means towards said guiding means and in cooperative relation with said skin removing, slitting and guiding means and for simultaneously drawing said element through said slit and into said passage by the movement of said strip.

23. An apparatus for sheathing a flexible element within a preformed strip having a passage therein, comprising the combination of a rotatable abrasive wheel for buffing the surface of said strip, means for adjusting the position of said strip towards and away from the axis of said wheel, means for longitudinally slitting the wall of said passage through said buffed surface, means for guiding said element into said slit, and means for longitudinally moving said strip from said slitting means towards said guiding means and in cooperative relation with said slitting and guiding means and for simultaneously drawing said element through said slit and into said passage by the movement of said strip.

24. An apparatus for sheathing a flexible element in a longitudinal substantially straight passage of a hollow flexible preformed strip which comprises cutting means capable of cutting through a wall of said hollow strip and hence to slit the wall upon longitudinal movement of said strip relative to said cutting means, means for spreading a portion of the slit, means for guiding the flexible element into said passage through the spread portion of said slit, and means for drawing said strip in the direction of its length and successively into cooperative relation with said cutting means to cause the latter to cut a longitudinal slit in said wall and into cooperative relation with said slit spreading and element guiding means and for simultaneously drawing said element from said element guiding means and into the passage of said strip by the movement of said strip.

25. An apparatus as claimed in claim 22 having means for applying an adhesive to those portions of said skinned surface that lie to either side of said slit, and means for applying a tape-like member longitudinally of said strip and onto the adhesive-bearing portions of said skinned surface to either side of said slit, thereby to hold the slit wall portions against parting.

26. An apparatus of the character described, in combination, a die having an orifice for forming, out of a suitable plastic uncured insulating compound, two continuous and unitary jackets or coverings for two conductors with a partially divided common wall therebetween for separating the two conductors, said orifice having projecting into it substantially along the central axis thereof, for action upon that portion of the compound that is to make up the aforesaid common wall, an apertured member shaped to divide the extruded common wall into two layers, means for forcing an uncured plastic compound through said orifice and past said apertured member, means coextensive with said aperture forming a guiding passageway for guiding a flexible element to the aperture in said die member in a direction to cause it to emerge therefrom on the same side that the extruded compound emerges from said orifice and thereby to be laid in between the two layers of said common wall, and means for curing the extruded plastic compound with said flexible element in between the two layers of said common wall.

27. An apparatus of the character described, in combination, a die having an orifice provided with a base portion and two portions upstanding therefrom, said orifice having projecting into it and positioned substantially on the central vertical axis thereof a substantially V-shaped member acting upon the extruded compound to divide off from each other and above the base portion the two portions upstanding therefrom, means for forcing through said orifice a plastic rubber compound, said die having two apertured members each projecting into one of said upstanding orifice portions for causing the latter to form, in the extruded compound, two continuous and unitary conductor jackets or coverings connected together by a base portion corresponding to said base portion of said orifice, said V-shaped member forming a progressively widening transverse space between the two conductor jackets formed by said two upstanding orifice portions and their respective projecting members, means operating as the extruded form moves away from the orifice to hold the conductor jacket portions apart, thereby to open and make said space accessible, means for supplying to said space while the latter is made accessible by said last-mentioned means a material having the characteristic of preventing opposed parts of rubber compound from adhering, and means for curing the extruded form with said adhesion-preventing material preventing the surface areas covered by it from being vulcanized together.

28. An apparatus of the character described, in combination, a die having an orifice for forming a conduit form with relatively thin walls to be extruded through said die, means for forcing a plastic compound such as rubber compound through said orifice, said orifice comprising a base portion and two portions upstanding from said base portion, two core members each projecting into one of said upstanding orifice portions for causing the latter to form, in the extruded conduit form, two continuous and unitary thin-walled conductor jackets or coverings connected together by a base portion corresponding to said base portion of said orifice, dividing means coacting with said orifice for partially dividing off said two conductor jackets in the extruded form but to leave them connected through the extruded base portion, means for guiding a band-like member of suitable width, with its vertical central line substantially coincident with the mid-point between said two conductor jackets, from a point spaced inwardly of said orifice in a plane coincident with a face of the extruded base portion to a point external of said orifice, and means for pulling said tape in the direction from said first-mentioned point to said second-mentioned point at a rate commensurate with the rate of emission of extruded conduit form from said orifice, thereby to receive the extruded conduit form by way of said face of said bottom portion thereof and move it away from said orifice, said tape-pulling means maintaining the tape under such tension, as it moves away from said orifice, that said extruded conduit form is substantially freed from such longitudinal strains as would materially distort said thin-walled parts thereof and said tape holding said extruded base portion against strains tending to part it along the plane of division of one of said upstanding jackets from the other.

CHARLES W. ABBOTT.